US006944776B1

(12) United States Patent
Lockhart et al.

(10) Patent No.: US 6,944,776 B1
(45) Date of Patent: Sep. 13, 2005

(54) SYSTEM AND METHOD FOR DATA RIGHTS MANAGEMENT

(75) Inventors: Malcolm W. Lockhart, Apex, NC (US); D. Gordon Grimes, Apex, NC (US); Ranjiv K. Sharma, Chapel Hill, NC (US); Neal A. Musselwhite, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/548,356

(22) Filed: Apr. 12, 2000

Related U.S. Application Data

(60) Provisional application No. 60/128,762, filed on Apr. 12, 1999, provisional application No. 60/129,139, filed on Apr. 13, 1999.

(51) Int. Cl.[7] .............................................. G06F 12/14
(52) U.S. Cl. ....................................... 713/202; 705/59
(58) Field of Search ............ 705/50–59; 713/200–202, 713/176

(56) References Cited

U.S. PATENT DOCUMENTS

| | | | |
|---|---|---|---|
| 4,528,643 | A | 7/1985 | Freeny, Jr. |
| 4,827,508 | A | 5/1989 | Shear |
| 4,949,257 | A | 8/1990 | Orbach |
| 4,977,594 | A | 12/1990 | Shear |
| 5,050,213 | A | 9/1991 | Shear |
| 5,103,476 | A | 4/1992 | Waite et al. |
| 5,222,134 | A | 6/1993 | Waite et al. |
| 5,237,157 | A | 8/1993 | Kaplan |
| 5,410,598 | A | 4/1995 | Shear |
| 5,530,235 | A | 6/1996 | Stefik et al. |
| 5,586,186 | A | 12/1996 | Yuval et al. |
| 5,629,980 | A | 5/1997 | Stefik et al. |
| 5,634,012 | A | 5/1997 | Stefik et al. |
| 5,638,443 | A | 6/1997 | Stefik et al. |
| 5,659,742 | A | 8/1997 | Beattie et al. |
| 5,708,780 | A | 1/1998 | Levergood et al. |
| 5,715,403 | A | 2/1998 | Stefik |
| 5,845,281 | A | 12/1998 | Benson et al. |
| 5,852,800 | A | 12/1998 | Modeste et al. |
| 5,870,543 | A | 2/1999 | Ronning |
| 5,870,544 | A | 2/1999 | Curtis |

(Continued)

FOREIGN PATENT DOCUMENTS

| | | |
|---|---|---|
| EP | 0 715 247 A1 | 6/1996 |

(Continued)

OTHER PUBLICATIONS

Don Davis, *Kerberos plus RSA for World Wide Web Security*, originally published in the proceedings of the First USENIX Workshop on Electronic Commerce, New York, New York, Jul. 1995.

*Primary Examiner*—Matthew Smithers
(74) *Attorney, Agent, or Firm*—Klarquist Sparkman LLP

(57) ABSTRACT

A system and method for data rights management across multiple data rights management architectures is disclosed. The system and method solves the problems posed by multiple incompatible data rights management architectures. In particular, a data rights management clearing house is provided that generates permits, permit classes, and enables content packaging across multiple data rights management architectures. Consumers may acquire rights to content packaged with different data rights management architecture from the single data rights management clearing house. Additionally, the system and method enables content packagers to package content with multiple data rights management architectures. Finally, the data rights management clearing house provides consumers with a single location from which to manage data access rights and restore data access rights that have been lost.

24 Claims, 17 Drawing Sheets

U.S. PATENT DOCUMENTS

| | | | | |
|---|---|---|---|---|
| 5,872,850 | A | 2/1999 | Klein et al. | |
| 5,875,296 | A | 2/1999 | Shi et al. | |
| 5,883,954 | A | 3/1999 | Ronning | |
| 5,883,955 | A | 3/1999 | Ronning | |
| 5,887,060 | A | 3/1999 | Ronning | |
| 5,892,900 | A | 4/1999 | Ginter et al. | |
| 5,903,647 | A | 5/1999 | Ronning | |
| 5,907,617 | A | 5/1999 | Ronning | |
| 5,910,987 | A | 6/1999 | Ginter et al. | |
| 5,915,019 | A | 6/1999 | Ginter et al. | |
| 5,917,912 | A | 6/1999 | Ginter et al. | |
| 5,920,861 | A | 7/1999 | Hall et al. | |
| 5,922,208 | A | 7/1999 | Demmers | |
| 5,940,504 | A | 8/1999 | Griswold | |
| 5,943,422 | A | 8/1999 | Van Wie et al. | |
| 5,949,876 | A | 9/1999 | Ginter et al. | |
| 5,963,916 | A | 10/1999 | Kaplan | |
| 5,978,484 | A | 11/1999 | Apperson et al. | |
| 5,982,891 | A | 11/1999 | Ginter et al. | |
| 5,999,622 | A | 12/1999 | Yasukawa et al. | |
| 6,073,124 | A | 6/2000 | Krishnan et al. | |
| 6,112,181 | A | 8/2000 | Shear et al. | |
| 6,119,108 | A | 9/2000 | Holmes et al. | |
| 6,138,119 | A | 10/2000 | Hall et al. | |
| 6,151,631 | A | 11/2000 | Ansell et al. | |
| 6,157,721 | A | 12/2000 | Shear et al. | |
| 6,185,683 | B1 | 2/2001 | Ginter et al. | |
| 6,237,786 | B1 | 5/2001 | Ginter et al. | |
| 6,240,185 | B1 | 5/2001 | Van Wie et al. | |
| 6,253,193 | B1 | 6/2001 | Ginter et al. | |
| 6,292,569 | B1 | 9/2001 | Shear et al. | |
| 6,327,652 | B1 | 12/2001 | England et al. | |
| 6,330,670 | B1 | 12/2001 | England et al. | |
| 6,363,488 | B1 | 3/2002 | Ginter et al. | |
| 6,385,596 | B1 | 5/2002 | Wiser et al. | |
| 6,389,402 | B1 | 5/2002 | Ginter et al. | |
| 6,389,541 | B1 * | 5/2002 | Patterson | 713/201 |
| 6,398,245 | B1 * | 6/2002 | Gruse et al. | 280/228 |
| 6,427,140 | B1 | 7/2002 | Ginter et al. | |
| 6,438,690 | B1 * | 8/2002 | Patel et al. | 713/156 |
| 6,449,367 | B2 | 9/2002 | Van Wie et al. | |
| 6,618,484 | B1 | 9/2003 | Van Wie | |

FOREIGN PATENT DOCUMENTS

| | | |
|---|---|---|
| WO | WO 9936854 | 7/1999 |
| WO | WO 0034845 | 6/2000 |
| WO | WO 0034856 | 6/2000 |

* cited by examiner clearing house packaging process packaging tool packaging process

SYSTEM AND METHOD FOR DATA RIGHTS MANAGEMENT

The present application claims priority to Provisional Application No. 60/128,762, entitled "System and Method for Data Rights Management," filed on Apr. 12, 1999, and Provisional Application No. 60/129,139, entitled "System and Method For Data Rights Management," filed on Apr. 13, 1999, both of which are incorporated herein by reference as if reproduced below in their entirety.

BACKGROUND

1. Field of the Invention

The present invention relates to electronic commerce. More specifically, the present invention relates to a data rights management system and method for controlling access to data on the Internet.

2. Discussion of the Related Art

Since the advent of the Internet and the World Wide Web, electronic commerce, or e-commerce as it is commonly referred, has received increased attention as a mechanism for sellers and buyers to transact business in virtual stores.

Many types of businesses readily lend themselves to e-commerce. Certain businesses, such as mail-order businesses, merely transformed their paper catalogs to electronic web sites. Consumers are able to "surf" the web site viewing the businesses products and subsequently making purchases through a telephone operator or directly through the Internet. In some cases, consumers are able to place their prospective purchases in a "shopping cart" while they navigate the web site for later settlement.

Businesses dealing in intellectual property or information have been slow to move their businesses to the Internet for good reason. These types of businesses include, for example, the entertainment industry, the database industry, and any other industry in the business of selling "information." The entertainment industry incurs considerable expense to produce and market its product, e.g., music, motion pictures, etc. The database industry incurs considerable expense to gather information, organize it and store it in an accessible manner. Both of these industries are interested in protecting their investments in their respective properties and have been unwilling to merely place it on the Internet where it can be easily transferred among consumers with little regard to the owner's intellectual property rights. Some industries, particularly those dealing in information databases, may not yet exist simply because the cost of gathering the information exceeds the expected return.

Various solutions have been developed to "secure" the information using protection mechanisms including encryption. Secured or protected information cannot be accessed through normal means or casual computer access. In order to access the information, consumers must purchase the rights to the information. Once the rights are purchased, consumers are given a password, key, and/or an electronic device whereby the information can be accessed. In theory, only the consumer that purchased the rights to the information can use or access the information.

Many schemes have been developed to secure the information. One scheme uses a protected container. The information, or "content" as it is referred to herein, is placed in the container along with "access rules" governing the steps that must be taken in order for a consumer to access the content. The container is represented as a data stream, generally in a file, located on media such as a CD-ROM or magnetic diskette. The content may vary from a database or collection of databases to a piece or collection of music or other literary works to motion pictures as well as a host of other digital content. The content is protected in the container so that a consumer cannot access the content unless the proper rights have been obtained. The access rules describe the circumstances under which the consumer may access the protected content.

In this scheme, the access rules define the consumer's ability to access the content. For example, the access rules may define the cost of each piece of content, whether this cost is a one time payment or a payment for the amount of use of the content (i.e., by time or number of accesses), and what access the consumer has including viewing, copying, printing, etc. The access rules may also define who the consumer must pay and how this payment is to occur.

This system includes a rights enforcement engine that interacts with the container to access the content. Only the enforcement engine can access the content and transform it from a protected state to one accessible by the consumer. The enforcement engine retrieves the access rules from the container and evaluates them to determine whether the consumer has rights to the content. The enforcement engine may require the consumer to perform particular acts in order to obtain rights to the content as governed by the access rules.

A significant problem associated with the scheme described above is that the access rules reside in the container with the content. This makes it very difficult for a content provider (i.e. a content producer) or a web retailer (i.e., a content retailer) to alter the access rules once the containers have been released. Thus, the content providers or retailers are unable to offer discounts or offer special limited access to the content unless these promotions were considered at the time the container was created. Having the access rules in the container is not a practical solution to today's rapidly changing business environment. Moreover, development of various solutions and protection schemes has led to compatibility problems between schemes.

The importance of data rights management has caused a proliferation of incompatible solutions for protecting content throughout the industry. Examples of incompatible solutions are available from Intertrust™, Microsoft™, Adobe Systems™, Preview Systems™, Xerox Corporation™, and IBM™. Each solution is based on a different data rights management model, or architecture. Since each of the data rights management architectures is different, content protected in accordance with one architecture cannot be accessed with another. In some cases, a data rights management architecture is specific to a type of content, such as music, video or literary works.

Moreover, data rights management architectures include more than just accessing content. Content providers, or packagers, protect content by "wrapping it" in containers, in a process called packaging. Each data rights management architecture implements its own process for packaging, often with proprietary encryption and access methods. Content packaged within one data rights management architecture, therefore, is incompatible with another data rights management architecture. Consumers wishing to gain access to protected content, therefore, must utilize the system of the particular data rights management architecture that packaged the content.

Incompatible data rights management architectures pose a number of significant problems to distribution of content. Currently, each data rights management architecture requires a separate system for packaging content and distributing rights to the content. Content providers and content packagers using multiple data rights management architectures, such as when packaging music and information content, are forced to use multiple systems. When the number of different data rights management architectures and pieces of content is large, the process and management of packaging becomes difficult and unwieldy. Additionally, duplicating DRM architecture systems and storage is expensive and inconvenient.

Conventionally, each data rights management architecture requires its own separate system to grant rights to consumers. When attempting to access content, a consumer must be granted rights by a system corresponding to the originally protected content. Separate, independent systems essentially prohibit the central management of rights to content protected with incompatible data rights management architectures. With the growing number of data rights management architectures, content types, consumers and the amount of content available, granting access to protected content has become a very difficult task.

Incompatible data rights management architectures make commercial distribution of rights to protected content difficult. In particular, management of transactions, tracking and auditing of rights to content becomes very difficult. Moreover, if a transaction becomes corrupt, or a consumer has somehow lost the ability to access the content, reconstruction of the transaction across multiple data rights management is difficult at best.

Other problems exist with respect to data rights management systems, some of which are discussed in further detail below. Accordingly, what is needed is a system and method to integrate multiple, incompatible data rights management architectures that allow access rules to content to be defined outside the container.

SUMMARY OF THE INVENTION

The present invention solves the problems posed by incompatible DRM architectures by providing a DRM agnostic clearing house. The term "DRM agnostic" indicates that a particular system or method is independent of a particular DRM architecture. A DRM agnostic clearing house incorporates multiple DRM architectures into a single clearing house for the generation and management of permit classes, permits and permit offers. According to the present invention, access rights are provided through the use of "permits." Permits are digital devices that allow consumers to access protected content. Permit classes define which permits will enable a consumer to access protected content packaged with the permit class.

The DRM agnostic clearing house of the present invention generates permits, permit classes and enables packaging for any DRM architecture. The DRM agnostic clearing house insulates content providers, content packagers and content consumers from the incompatibilities and difficulties of multiple DRM architectures. The DRM agnostic clearing house provides for distributed packaging of content. Distributed packaging of content allows multiple packaging tools to package content using the same permit class.

The DRM agnostic clearing house also solves the problem of packaging content across multiple DRM architectures. Often, a content packager is forced to choose a particular DRM architecture because of the type of content (e.g., a music specific DRM architecture), an existing relationship with the content provider, or some other reason. The DRM agnostic clearing house provides centralized permit class management. Centralized permit class management provides for the establishment of distributed packaging across multiple packaging partners. Through centralized permit class management, a content packager or content provider may define permit classes with which content is to be packaged.

The DRM agnostic clearing house also provides the ability to generate permits across multiple DRM architectures. Often, web retailers offer content packaged with different DRM architectures to consumers. This poses a problem for web retailers because permits are traditionally DRM architecture specific, forcing web retailers to use multiple DRM systems. A DRM agnostic clearing house, however, can generate a permit associated with any of the DRM servers incorporated within the clearing house.

BRIEF DESCRIPTION OF THE DRAWINGS

The accompanying drawings, which are included to provide a further understanding of the invention and are incorporated in and constitute a part of this specification, illustrate embodiments of the invention that together with the following description serve to explain the principles of the invention.

DETAILED DESCRIPTION OF THE PREFERRED EMBODIMENT

Figure 1:
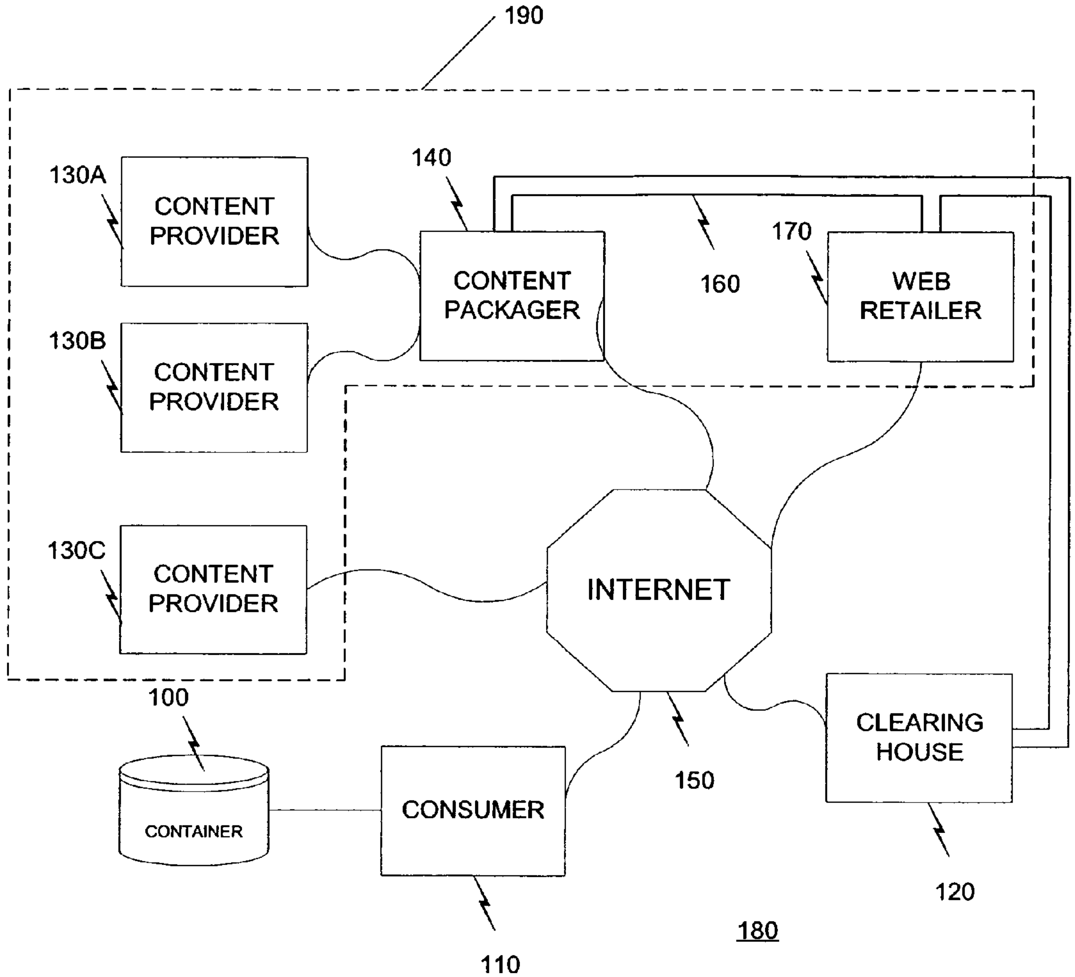
FIG. 1 illustrates a web environment according to the present invention.

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview

The present invention is a system and method for protecting and granting rights to content. Content may be any digital data provided by a content provider. Examples of content include, but are not limited to, music, video, literary works, commercial database information, etc. Content is protected by placing it in "containers." The container may be any data stream, but is generally a file that may be transmitted via the Internet, or delivered in a physical form, such as a CD-ROM, magnetic disk, etc. Access to content in the container is specified by "access rules." Access rules are the steps, or criteria, governing the access to content. For example, access rules may require a consumer to acquire rights to content before the content may be accessed. Consumers are any party that wishes to access content protected within a container.

The process of putting content into a container is called "packaging." Generally, content is packaged by a content packager. Often, the content provider packages the content before providing it to consumers, or third parties, such as web retailers. In the packaging process, content is usually packaged with a packaging tool. A packaging tool takes content, some form of content access rules and creates a container with protected content. Once protected content has been packaged within a container, a consumer must acquire access rights the content.

To access protected content within containers, consumers must acquire certain rights. Access rights to the content may be acquired from the content provider, content packager or web retailer. According to the present invention, access rights are provided through the use of "permits." Permits are digital devices that allow consumers to access protected content. A consumer negotiates a permit and downloads and installs that permit from a content provider, content packager, web retailer, or clearing house.

According to the present invention, a clearing house generates and distributes permits, and manages certain aspects of the e-commerce transaction. Once the consumer has downloaded and installed the appropriate permit to access the container, access to the content is provided through a viewer. A viewer may be any software through which the consumer accesses the protected content, such as a media viewer, a protected content browser, a music player, etc.

Preferably, the viewer includes a rights enforcement engine that interacts with the container to access the content. Only the rights enforcement engine in conjunction with the permit can access the content and transform it from a protected state to one accessible by the consumer. The rights enforcement engine retrieves the access rules from the container and evaluates them to determine whether the consumer has rights to the content. The enforcement engine may require the consumer to negotiate or fulfill requirements (e.g., payment, providing information, etc.) in order to obtain rights to the content as governed by the access rules.

In one embodiment, the present invention solves the problem of access rules residing with access rules residing within the container. In conventional systems, the access rules within the container limit how the content may be accessed by the consumer according to a set of predefined rules within the container. This makes it very difficult for a content provider or web retailer to alter the access rules once the container has been released. The present invention, however, provides a container and viewer that separates the access rules from the protected content so that a content provider, content packager or web retailer may change the access rules for accessing content after a container has been released. Essentially, external "offers" to purchase rights to protected content are defined and offered to a consumer. The offer is defined outside the container, preferably at a location on the Internet. The offer defines the terms by which the consumer may obtain a permit to access the protected content. A container may be packaged so that a number of permits provide differing levels of access to the protected content. Depending on the particular offer accepted by the consumer, and the resulting permit downloaded and installed, the consumer will have differing levels of access to the content. The viewer works with the downloaded permit through the rights enforcement engine to implement the level of content access defined by the permit.

Permits are generated according to a data rights management (DRM) architecture. The DRM architecture defines the process for packaging and granting rights to content. There are a number of commercially available DRM architectures, from sources such as Intertrust™, Microsoft™, Adobe Systems™, Preview Systems™, Xerox Corporation™, and IBM™. Different DRM architectures, generally incompatible with one another, are typically implemented as systems. Each DRM architecture system provides tools for packaging content, generating permits, distributing permits to consumers, and using the permits to provide access to the content. Because each of the DRM architectures is different, content packaged with one DRM architecture cannot be accessed with another. In some cases, a DRM architecture is specific to a type of content, such as music, video or literary works.

DRM architecture systems are a group of utilities, or tools implementing the features of a particular DRM architecture. Typically, a DRM architecture system includes software and technology for packaging content, such as a DRM specific packager, generating permits to access protected content, and a rights enforcement engine for accessing protected content with a permit. The DRM specific packager protects content in the container defined by the DRM architecture.

Content packagers package content according to a particular DRM architecture. In order to package content, a content packager must obtain a "permit class" from the DRM architecture system that governs access to the content. Permit classes define which permits will enable a consumer to access protected content packaged with the permit class. A DRM server, or permit server, generates permits and creates permit classes. Using a permit class, a packager is able to create a container with protected content accessible only to a consumer with a permit associated with the permit class. The various DRM architectures use different nomenclature to describe permits and permit classes, but essentially, permits are used by consumers to access protected content, and permit classes are used to define the permits required to access protected content.

Each DRM architecture system has an associated process for generating permits and installing those permits at the consumer device. Preferably, some consumer identifying information is read from the consumer device. Preferably, this information uniquely identifies the consumer device, and in one embodiment, includes a serial number from the consumer device. Other forms of information uniquely identifying a particular user or consumer device may be used as would be appropriate. In any case, the consumer device identifying information is passed to the clearing house when a new permit is requested. Preferably, the consumer device identifying information is used to generate a permit that is unique to the particular consumer device.

A DRM server, or permit server, within the clearing house generates the permit according to the particular implementation of the DRM architecture supported by the permit server. Typically, vendors of DRM architectures provide a set of Application Programming Interfaces ("APIs") that implement the features of the DRM architecture system. The DRM server, or permit server, implements the various DRM architecture APIs to provide the functionality associated with the DRM architecture system. The permit server generates the permit from a particular permit class. Permit classes define which permits will enable a consumer to access protected content within a container. In order to generate a permit, the permit server must receive a request to generate a permit with the associated permit class.

After the clearing house has generated a permit, the permit is provided to the consumer. Preferably, the clearing house transmits a download and install permit URL ("install permit URL") electronically via the Internet or an email message. The install permit URL identifies a location, preferably at a web site of the clearing house where the consumer may download and install the permit. Preferably, the consumer accesses the install permit URL, and a program or executable file is retrieved, and executed at the consumer device thereby installing or binding the permit to the consumer device. Other mechanisms for providing the permit to the consumer may be used such as sending the permit to the consumer via, for example, email.

The present invention solves the problems posed by incompatible DRM architectures by providing a DRM agnostic clearing house. The term "DRM agnostic" indicates that a particular system or method is independent of a particular DRM architecture. A DRM agnostic clearing house incorporates multiple DRM architectures into a single clearing house for the generation and management of permit classes, permits and permit offers.

The DRM agnostic clearing house of the present invention generates permits, permit classes and enables packaging for any DRM architecture. The DRM agnostic clearing house insulates content providers, content packagers and content users from the incompatibilities and difficulties of multiple DRM architectures.

More specifically, the DRM agnostic clearing house is a clearing house system that incorporates multiple DRM servers. Typically, vendors of DRM architectures provide a set of APIs that implement the features of the DRM architecture system. The DRM server, or permit server, implements the various DRM architecture APIs to provide the functionality associated with the DRM architecture system. The interfaces to the DRM servers are abstracted so that the functionality of generating permit classes and permits of each DRM server is incorporated in a single, DRM agnostic clearing house. From the DRM agnostic clearing house, a consumer may acquire any permit for which a DRM server has been incorporated. For example, if both Microsoft™ and Adobe Systems™ DRM servers have been incorporated into the DRM agnostic clearing house, the clearing house may generate and issue permits and permit classes for content packaged by either the Microsoft™ or Adobe Systems™ DRM architecture.

The DRM agnostic clearing house solves many of the problems of multiple DRM architectures. First, the DRM agnostic clearing house provides for distributed packaging of content. Distributed packaging of content allows multiple packaging tools to package content using the same permit class. Packaging of content is accomplished through the use of a packaging tool and permit class. The clearing house of the present invention is a central repository for all the permit classes created by the incorporated DRM servers. A content provider or packager, seeking to package content, accesses the clearing house and requests a permit class for packaging. The request includes a message specifically identifying the permit class to be used in the packaging process. If not already created, the clearing house creates the permit class and then returns information associated with the permit class, such as encryption information and identifiers, to the requesting packager tool. Because the clearing house stores all of the permit classes centrally, multiple packaging tools may be used to package content with the same permit class.

The DRM agnostic clearing house also solves the problem of packaging content across multiple DRM architectures. Often, a content packager is forced to choose a particular DRM architecture because of the type of content (e.g., a music specific DRM architecture), an existing relationship with the content provider, or some other reason. The content packager, therefore, is often required to deal with multiple DRM systems and servers to package content for different DRM architectures. As the amount of content, number of different DRM architectures, and consumers increases, managing the different DRM systems becomes unwieldy. The DRM agnostic clearing house solves the problem of packaging across multiple DRM architectures by providing a single packaging interface for multiple DRM architectures. At packaging time, the content packager need only specify the particular DRM architecture with which the content is to be packaged, and the clearing house returns the permit class necessary for packaging.

The DRM agnostic clearing house provides centralized permit class management. Centralized permit class management provides for the establishment of distributed packaging across multiple packaging partners. Through centralized permit class management, a content packager or content provider may define permit classes with which content is to be packaged. A permit class identifier, unique to the permit class, may be created and distributed to packaging partners. Packaging partners, such as other content packagers, may use the permit class identifier and permit class defined at the clearing house to package content. The centralized definition and management of the permit class enables new packaging business relationships to be developed.

The DRM agnostic clearing house also provides the ability to generate permits across multiple DRM architectures. Often, web retailers offer content packaged with different DRM architectures to consumers. This poses a problem for web retailers because permits are traditionally DRM architecture specific, forcing web retailers to use multiple DRM systems. A DRM agnostic clearing house, however, can generate a permit associated with any of the DRM servers incorporated within the clearing house. For example, a consumer wishes to access the protected content within a container. The container was obtained from a web retailer that provides an offer to the consumer to acquire the access rights to the content within the container. When the consumer accepts and fulfills the requirements to obtain the permit to access the content, the web retailer begins the process of generating a permit for the consumer. A request for a permit associated with the container is submitted to the clearing house. The request can either be bound to a particular Internet address (i.e., "URL"), or generated dynamically by the web retailer. Regardless, the request ultimately identifies the particular permit class of theh permit required to obtain the negotiated level of access to the protected content. Since the DRM agnostic clearing house supports multiple DRM architectures, the clearing house accepts requests for permits from any of the incorporated DRM servers. The clearing house generates the permit in accordance with the request, and provides the permit, either directly, or through the web retailer, to the consumer.

Consumer rights management is an important benefit of DRM agnostic permit generation. Consumer rights management provides the consumer with the option of managing and restoring rights to content already acquired. Often, a consumer will acquire rights to a number of different pieces of content. Because content is often packaged with different DRM architectures, it is likely that the consumer will receive permits to access content from multiple DRM architectures. This poses a significant barrier to consumer rights management. In conventional systems, the consumer must access multiple clearing houses to manage the rights already acquired. For example, if the consumer access rights to content are somehow "lost" (e.g., a hard disk failure, etc.), the rights will only be restored after the consumer has contacted every clearing house from which the rights were acquired.

A DRM agnostic clearing house, on the other hand, provides a central location where a consumer may acquire and manage rights. Because a single clearing house distributes access rights for multiple DRM architectures, a consumer may acquire all access rights from a single clearing house. The clearing house tracks the access rights of the consumer in a consumer account. The consumer account includes a compete history of the access rights the consumer acquired. If, at some point in the future, the consumer access rights are lost, the clearing house becomes a central location for rights restoration. The consumer need only access the consumer account, with appropriate identifying information, to restore the lost access rights.

Another important benefit of the DRM agnostic clearing house is enabling a content provider or packager to convey the right to distribute permits to third parties, such as web retailers. The content packager packages the content using a particular permit class. The resulting container is then distributed, or made available to consumers in any of a number of ways. For example, the container can be made available through web retailers, web sites, on media such as magnetic disk or CD-ROM, etc. The content packager provides the permit class identifier, uniquely identifying the permit class for generation of permits to web retailers. When a consumer wishes to purchase the access rights to the protected content on the container, the web retailer provides the permit class identifier to the clearing house, and the clearing house generates the associated permit, as described above. The permit is provided to the consumer, thereby granting access to the content.

These, and other features of the invention are described in more detail below.

Exemplary Environment

The preferred environment of the present invention is a networked environment where content providers, content packagers, web retailers, consumers and clearing house affect the communication needed to carry out the system and method of the present invention.

FIG. 1 illustrates an overview of a web environment 180, in which the present invention operates. Web environment 180 includes various elements generally useful for carrying out data rights management, as described above. Web environment 180 may include a container 100, a consumer 110, a clearing house 120, one or more content providers 130 (shown individually as a content provider 130A, a content provider 130B, and a content provider 130C), a content packager 140, and a web retailer 170. Content providers 130, content packager 140 and web retailer 170 are known collectively as sponsors 190.

In a preferred embodiment of the present invention, content provider 130C, content packager 140, web retailer 170, clearing house 120 and consumer 110 are interconnected to one another via Internet 150. In other embodiments of the present invention, these elements may be connected via other communication mechanisms as would be apparent. In addition to the Internet connections, content packager 140, web retailer 170 and clearing house 120 may be interconnected to one another via a secure or dedicated communication channel 160 employing the Internet 150 or some other communication mechanism.

In web environment 180, consumer 110 has in its possession container 100. Consumer 110 may have received container 100 via the Internet 150 from a source such as web retailer 170, via diskette, or other media, from a friend or other source, or some other form of distribution including from a retail store (i.e., "brick-and-mortar" retailer). However, consumer 110 does not necessarily have access to the contents of container 100 even though he has container 100 in his possession. In order to access the contents of container 100, consumer 110 must first obtain access rights the contents. The process of obtaining rights is discussed in further detail below.

Certain content providers, such as content provider 130C, may provide their content in containers 100 directly to consumers 110 via Internet 150. Other content providers, such as content providers 130A and 130B, may provide content to content packager 140 who packages the content in containers 100 is described below. Content packagers 140 may subsequently provide containers 100 to consumers 110 via the Internet 150 or to web retailers 170 who provide containers 100 to consumers 110. Clearing house 120 manages certain aspects of the transactions associated with containers 100 is described in further detail below.

Containers

Figure 2:
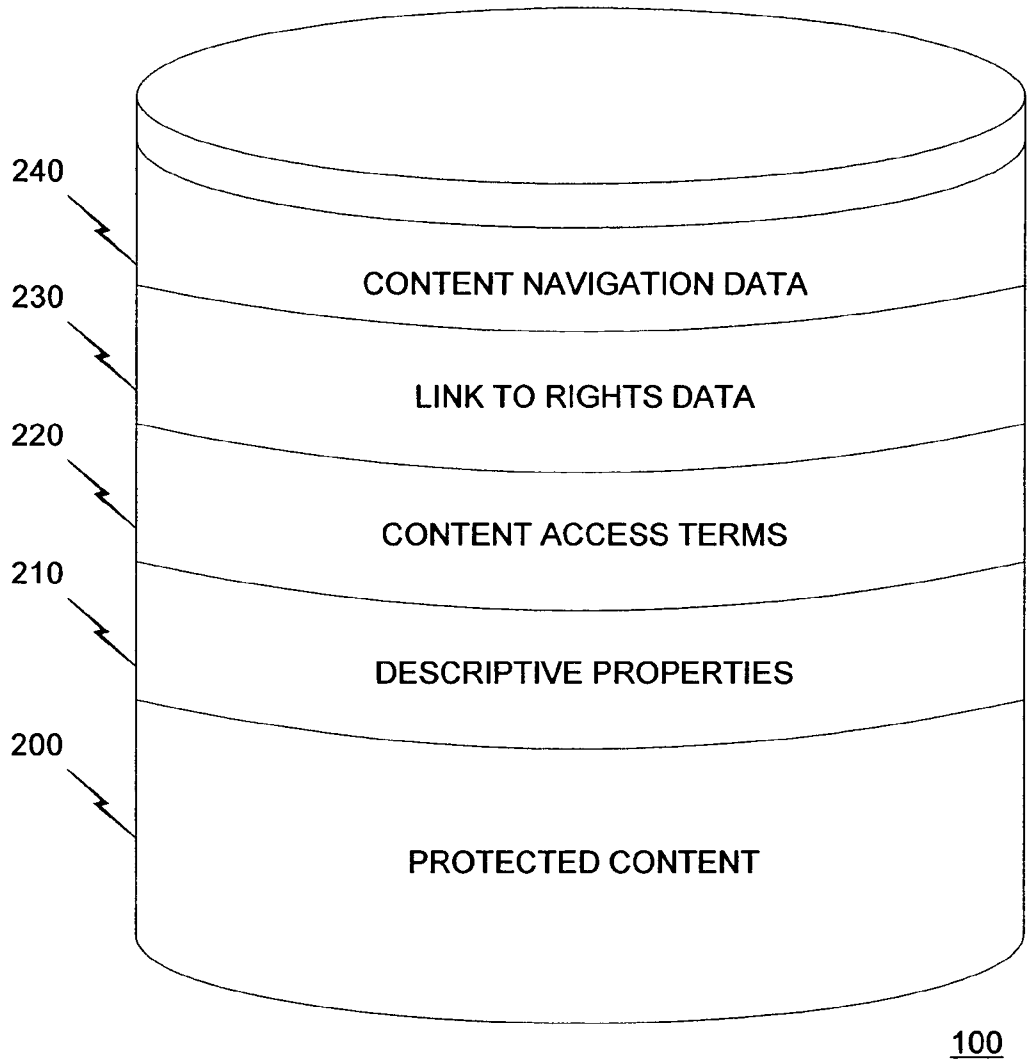
FIG. 2 illustrates a container according to the present invention.

FIG. 2 illustrates container 100 according to the present invention. Free access to content is prevented by placing it in container 100. The process of protecting content by placing it into a container is called "packaging." Generally, content is packaged by a content packager 140. Often, content providers 130 package the content before providing it to consumers, or third parties, such as web retailers. In the packaging process, content is usually packaged with a packaging tool. A packaging tool takes content, some form of content access rules and creates container 100. Once content has been packaged within a container, consumer 110 may be required to acquire access rights the content.

In a preferred embodiment of the present invention, container 100 includes protected content 200, at least one descriptive property 210, at least one content access term 220, a link to access rights data 230, and content navigation data 240. Each of these components of container 100 are now described.

Generally speaking, all the information included in container 100 is either "content" or "meta-data" (i.e., information related to the content or to container 100 itself). Furthermore, in some embodiments of the present invention, some or all of the "content" in container 100 may be protected, that is, a casual reader is unable to access any of the information in container 100. Protected content 200, sometimes also referred to as "payload," is the information in container 100 which consumer 110 desires to access. Protected content 200, thus, may be considered as that content in container 100 having commercial or other value. In addition, although not specifically illustrated in FIG. 2, container 100 may also include "unprotected content" that may or may not have commercial value. It should be understood that the operations and functionality described herein with respect to protected content 200 may also apply to "unprotected content."

Protected content 200 may be any sort of information including, but not limited to, lists, databases, music, video, etc. A piece of content 200 as referred to herein generally refers to a commercially viable unit of content, e.g., a song, an album, a book, etc., although a piece of content 200 may refer to individual bytes of information. Protected content 200 is "protected" in container 100 in the sense that while protected content 200 may be "read" via various mechanisms, it is not decipherable. In other words, consumer 110 does not have access to protected content 200. Protected content 200 may be protected by various well-known protection and/or encryption schemes as would be apparent.

Descriptive properties 210 comprise meta-data that describes protected content 200 or container 100. Descriptive properties 210 may include a title, a date associated with the content's creation or modification, file size, and/or other information concerning container 100 or its contents. Descriptive properties 210 may include information similar to that used by typical file systems. Descriptive properties 210 may also include URL path information for internal navigation data mapping.

In general, access to content is achieved via two methods. The first method is comprised of content access terms 220 which define or describe the information a rights enforcement engine requires for access to be granted to protected content 200. In other words, this information defines or describes the requirements needed in order for the rights enforcement engine to transform protected content 200 from a protected state to one that is accessible by consumer 110. This first method is specific to a particular rights enforcement engine and its implementation may vary accordingly.

The second method exists outside of the container (in a backoffice of clearing house 120) and defines or describes the information or protocols necessary for a consumer 110 to obtain rights in protected content 200. Specifically, this information defines or describes what consumer 110 must do to acquire rights or permission to access protected content 200. In other words, this information defines or describes the "permit acquisition terms." Permits are digital devices that allow consumers to access protected content. The implementation of this method is specific to a particular collection of rights as related to the parties involved (i.e., consumer 110, content providers 130, content packagers 140, web retailers 170, and/or clearing house 120, etc.) and may also vary accordingly. Thus, access to content includes two facets: those terms required to satisfy the rights enforcement engine 220 and the permit acquisition terms.

According to a preferred embodiment of the present invention, link to access rights data 230 may include an Internet address or URL address that identifies a web site where access rights data corresponding to protected content 200 is found. According to the present invention, this web site becomes the starting point for evaluating whether consumer 110 may acquire access rights to content 100 if he does not already have them. In essence, link 230 provides a link to the permit acquisition terms rather than storing them in the container itself. This significantly enhances the flexibility of container 100 because content providers 130, content packagers 140 and/or web retailers 170 may alter the permit acquisition terms very easily without redistributing containers 100. The importance of this flexibility cannot be overstated.

According to the present invention, content navigation data 240 includes various information to enable navigating the contents of container 100 including protected content 200. In a preferred embodiment of the present invention, navigation data 240 includes a map of the contents of container 100 to facilitate navigation of container 100 in a web-like manner. This map includes translation data to resolve URL references to one or more pieces of content, including protected content 200. These references may be embedded in the content. This map is used by viewer 300 to locate or reference the contents of container 100 to provide consumers 110 with the same "look and feel" of an Internet web site. In essence, navigation data 240 facilitates a "web site in a container." Navigation links in the contents of container 100 may include links to other content inside container 100 including links to protected content 200, as well as links to data outside container 100 (e.g., to web pages, or other data, accessible via the Internet 150 or local file system).

In a preferred embodiment of the present invention, a packaging tool may be used during the creation of container 100 to "drag and drop" a conventionally implemented web site into container 100. The web site in container 100 would then function with viewer of FIG. 3, as described below. As such, consumer 110 will navigate the content of container 100 as if consumer 110 was navigating a web site.

Viewer

A viewer may be any software through which the consumer accesses the protected content, such as a media viewer, a protected content browser, a music player, etc. Preferably, the viewer includes a rights enforcement engine that interacts with container 100 to access protected content 200. Only the rights enforcement engine can access the content and transform it from a protected state to one accessible by the consumer. The rights enforcement engine retrieves the access rules from the container and evaluates them to determine whether the consumer has rights to the content. The rights enforcement engine may require the consumer to perform particular acts in order to obtain rights to the content as governed by the access rules.

Figure 3:
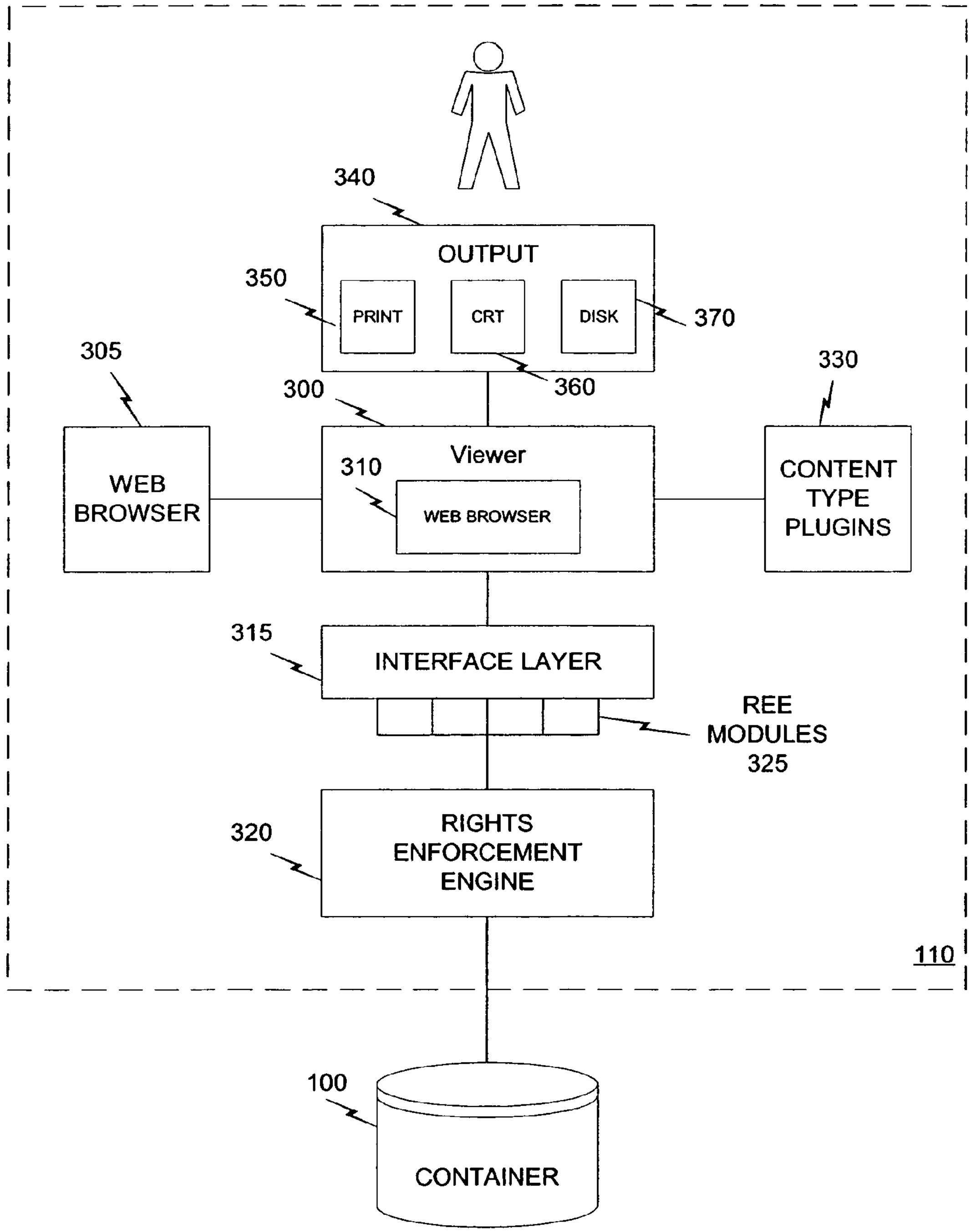
FIG. 3 illustrates a viewer according to the present invention.

Generally, viewer 300 of FIG. 3 enables consumer 110 to access protected content 200 in container 100. Rights enforcement engine 320 provides viewer 300 with access to protected content in container 100. Rights enforcement engine 320 may be any one of a number of commercially available rights enforcement engines, is described below. Interface layer 315 and Rights Enforcement Engine (REE) modules 325 provide an interface between viewer 300 and rights enforcement engine 320. Through interface layer 315, REE modules 325 and rights enforcement engine 320, viewer 300 is able to present protected content 200 at output 340. REE modules 325 and rights enforcement engine 320 are DRM architecture specific. Rights enforcement engine 320 is preferably provided by a vendor of a particular DRM architecture, as part of the DRM architecture system.

More specifically, FIG. 3 illustrates the particular aspects of consumer 110 according to the present invention. Consumer 110 includes a user and a collection of tools operating on a consumer device. These tools include a viewer 300 incorporating an embedded web browser 310, a web browser 305 external to viewer 300, a rights enforcement engine 320, an interface layer 315 and one or more REE modules 325 between viewer 300 and rights enforcement engine 320, and an output device 340. In addition, these tools may include one or more various content-specific plug-ins 330 for secure rendering of content having specific formats. Output device 340 may include a display or playback device 360 for viewing or playing the contents of container 100, a printer 350 for printing the contents, and/or a disk or other storage device for storing the contents outside container 100. As would be apparent, access to these devices may be selectively controlled.

Viewer 300 controls interaction between container 100 and the other tools. In a preferred embodiment of the present invention, web browser 310 is embedded in viewer 300. Viewer 300 operates with the particular operating system of the consumer device to perform various standard functions as would be apparent. Viewer 300 also interacts with rights enforcement engine 320 to allow consumer 110 to access container 100. This interaction is facilitated by interface layer 315 and REE module 325. REE module 325 is specific to rights enforcement engine 320. Interface layer 315 includes binding code that introduces a level of abstraction between viewer 300 and rights enforcement engine 320. REE modules 325 adapt interface layer 315 to specific rights enforcement engines 320.

According to the present invention, rights enforcement engine 320 includes the basic functions to access the contents of container 100 particularly protected content 200. Rights enforcement engine 320 transforms protected content 200 from a protected state to a state accessible by consumer 110. Various rights enforcement engines 320 exist including Microsoft's Data Rights Manager and InterTrust Technologies Corporation's Commerce and Enterprise Edition Products, as well products from Adobe Systems™, Preview Systems™, Xerox Corporation™, and IBM™, and others.

Viewer 300 (and interface layer 315) operates as an interface between container 100 and rights enforcement engine 320 creating a level of abstraction from a particular rights enforcement engine 320. Viewer 300 interacts with container 100 and the other tools to facilitate various operations associated with container 100. In particular, viewer 300 retrieves content navigation data 240 from container 100 and passes the information, such as HTML data and other web type data, to web browser 310. Viewer 300 with web browser 310 facilitates consumer 110 obtaining rights to protected content 200 as described in further detail below. Viewer 300 also operates with rights enforcement engine 320 once those rights have been obtained so that consumer 110 may access protected content 200 in a secure manner according to content access terms 220.

In a preferred embodiment, viewer 300 operates with rights enforcement engine 320 through interface layer 315 and REE modules 325 allowing consumer 110 to navigate protected content 200 in a web-like manner with embedded web browser 310. In a preferred embodiment, web page information, such as HTML, is referenced by web browser 310. For example, when consumer 110 selects a link in the web page information, web browser 310 attempts to access, or retrieve, the web information referenced by the link. Viewer 300, interface layer 315, and REE modules 325 intercept the attempt of web browser 310 to reference the web information referenced by the link, and use the link and information in container 100 to retrieve information from protected content 200 representing the web information referenced by the link. The web page information is passed to web browser 310 where it is displayed according to the particular browser implementation.

In a preferred embodiment of the present invention, viewer 300 operates with "off the shelf" tools and appropriate binding code. That is, modification of the source code of these tools is not required. More specifically, viewer 300 and/or interface layer 315 transforms or remaps data between these tools and container 100 so that the tools operate on data as their respective designers intended albeit for sometimes other purposes.

In a preferred embodiment of the present invention, web browser 310 includes Microsoft's™ Internet Explorer™. In an alternate embodiment, web browser 310 includes Netscape™ Navigator™ Web Browser. In each of these embodiments, viewer 300 operates in an embedded mode with respect to web browser 305. Furthermore, viewer 300 incorporates the web control framework of web browser 310. In effect, this embodiment functions as a web browser 305 with an embedded viewer 300 with an incorporated web browser 310.

Implemented in this manner, viewer 300 is able to reference and resolve URL links via the Internet (including links to other containers 100); URL links to content in container 100, including protected content 200, (i.e., "container pages"); and URL links to data on the local file system. According to the present invention, container 100 may include container pages that include links to content in container 100 including protected content 200, to other web pages on the Internet, to other containers 100 on the Internet, and/or any of the above found locally. Accordingly, viewer 300 must be able to transparently operate in three distinct zones: a file system, the Internet, and a container 100 (i.e., a protected file system).

In addition to being able to manage container pages, viewer 300 is also able to resolve other data such as .gif files, script (e.g., javascript), applets, etc., referenced by the container pages. This other data may reside in any of the three zones. This further enhances the flexibility of the container pages placed inside container 100.

Viewer 300 also migrates various features of web browsing to containers 100. One such feature includes the "history" feature commonly found in web browsing applications. Specifically, viewer 300 treats browsing to container 100 or pages in container 100 as browsing any other web site or web page, respectively. Viewer 300 maintains a history of browsing containers 100 so that "Back," "Forward," "Go To" functions and other similar functions operate with respect to container pages as if they were conventional web pages.

Because of the nature of protected content in container 100, viewer 300 maintains container 100 (and their subordinate content, including protected content 200) in an "opened" state once consumer 110 has gained rights to the contents. Protected content 200 is "opened" in the sense that content access terms 220 including permit acquisition terms have been satisfied and consumer 110 may access protected content 200. Preferably, "opened" does not equate to "unprotected," that is, protected content 200 should remain secure. Once protected content 200 has been opened, viewer 300 maintains content 200 in an "open" state during a session so that consumer 110 does not have to reacquire rights to protected content 200 while navigating other pages or other content. In other words, consumer 100 may go back to protected content 200 that he opened earlier in a session without having to reacquire rights to protected content 200. While containers 100 are preferably maintained as open during a session, other maintenance periods could be implemented as would be apparent.

Viewer 300 also operates with various content type plug-ins 330 that enable secure rendering of particular content not typically supported by web browser 310. Thus, viewer 300 operates with plug-ins that render various data formats including, by way of example, MPEG, streaming video, Microsoft Word, Microsoft Excel, Microsoft PowerPoint, Adobe PDF, as well as a host of other data formats as would be apparent.

In a preferred embodiment of the present invention, rights enforcement engine 320 includes any of: Microsoft's Data Rights Manager and InterTrust Technologies Corporation's Commerce and Enterprise Edition Products, as well products from Adobe Systems™, Preview Systems™, Xerox Corporation™, and IBM™, and others. In an alternate embodiment, rights enforcement engine 320 includes InterTrust Technologies Corporation's Commerce and Enterprise Edition Products. In still alternate embodiment, rights enforcement engine 320 includes any DRM architecture that provides a rights enforcement engine. Each operates with viewer 300 through interface layer 315 to implement a permit architecture is described in further detail below.

In a preferred embodiment of the present invention, viewer 300 and the tools operate on a suitable computer platform and associated peripheral devices. Preferably, the computer platform runs an operating system such as Microsoft Windows.

Permit Architecture

Figure 4:
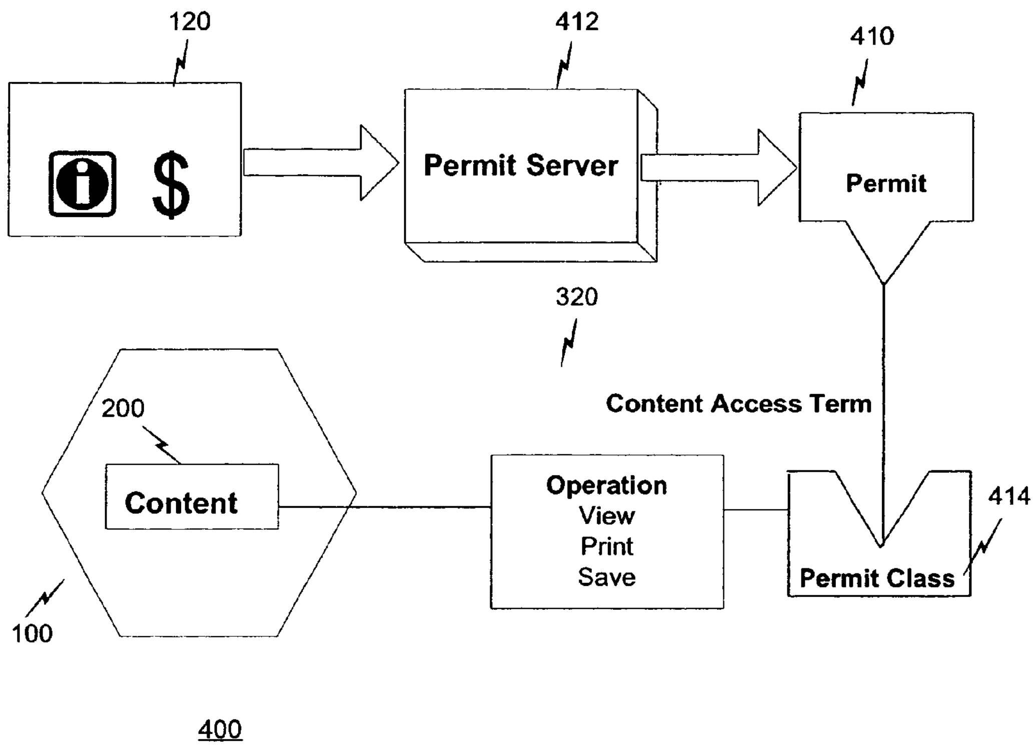
FIG. 4 illustrates the operation of a permit architecture according to the present invention.

While a container 100 may be obtained free of charge, consumer 10 may be required to purchase the permit that allows access to content 200. Additionally, as a pre-condition to granting a permit, web retailer 170, content provider 130, or clearing house 120 may wish to vet, or investigate, consumer 110 and/or collect demographic information from him. FIG. 4 generally illustrates the features and operation of the permit architecture 400 according to the present invention.

In a preferred embodiment of the present invention, access rights to content 200 are provided by permits. Permits are downloaded and installed at consumer 110, allowing rights enforcement engine 320 to provide access to protected content 200.

Generally speaking, permit management architecture describes the mechanisms by which permits 410 are established, specified, provisioned, and stored, by which consumers 110 satisfy the acquisition terms (e.g., by providing information and or payment) to obtain permits 410, and by which permits 410 are delivered.

The permit architecture 400 of FIG. 4 illustrates a generic implementation of specific DRM architectures. Permit architecture 400 includes clearing house 120, permit server 412, permit 410, rights enforcement engine 320, permit class 414, container 100, and protected content 200. Consumer 110 interacts with clearing house 120 (or alternatively, web retailer 170) to satisfy the permit acquisition terms, thereby requesting a permit. DRM server 412 generates permit 410 in response to a request for a permit from clearing house 120. DRM server 412 is specific to a DRM architecture. The particular form of the permit is dictated by the DRM architecture of DRM server 412. Permit 410 may be in the form of an encryption key, an encryption string, or other key type data ultimately granting access rights to consumer 110. Permit 410 is downloaded and installed at the device of consumer 110. Normally, some consumer device identifying information has been uploaded by clearing house 120 from the device of consumer 110. The consumer device identifying information is used to create a permit specific to the device of consumer 110, and, preferably, may not be used on another consumer device. Once permit 410 is downloaded and installed, rights enforcement engine 320 reads protected content 200 from container 100.

Content 100 has been packaged according to a particular DRM architecture. In order to package content, content packager 140 must obtain a "permit class" from the DRM architecture system that will eventually generate the permits used to access the content. Permit classes define which permits will enable a consumer to access protected content. Rights enforcement engine 320 reads protected content 200 from container 100, and checks permit 410 against permit class 414, with which protected content 200 associated during its creation. If permit 410 is the appropriate permit with which to access protected content 200, rights enforcement engine 320 grants access to consumer 110.

Figure 5:
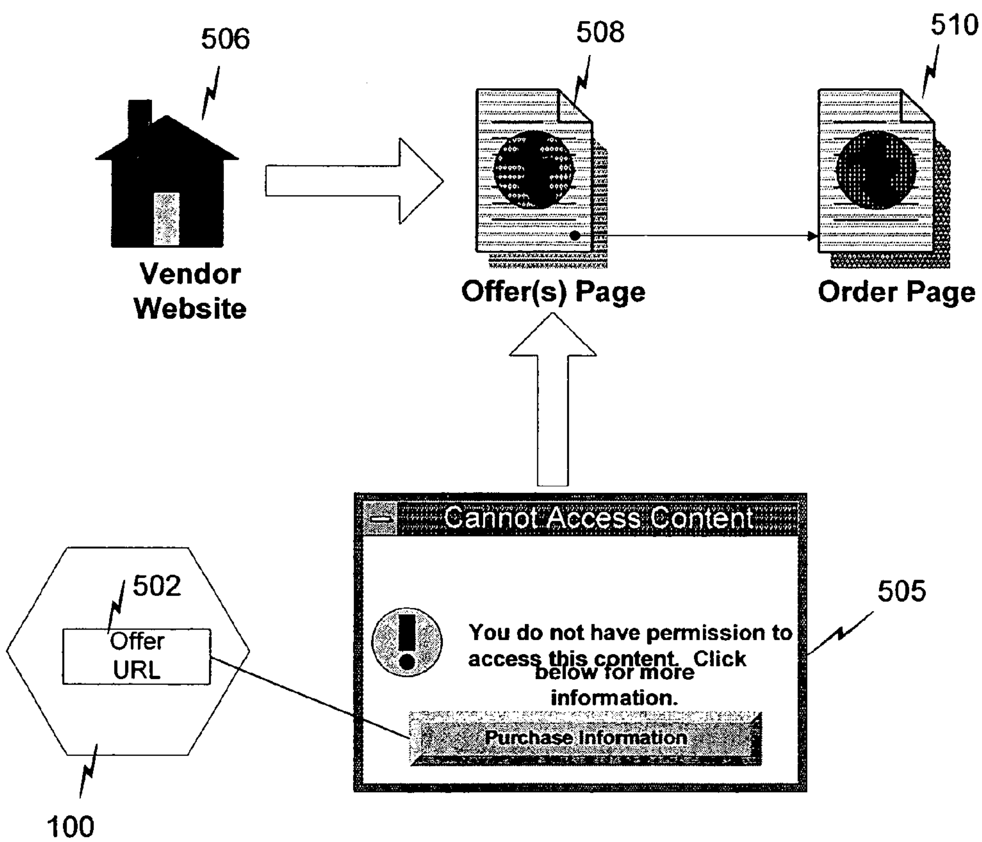
FIG. 5 illustrates the operation of the permit architecture if a consumer does not have permission to access protected content.

FIG. 5 illustrates two of the methods by which consumer 110 may obtain permit 410 to access protected content 200 in container 100. In both methods, consumer 110 is presented with an offer page 508, preferably an HTML web page, from which consumer 110 may order permit 410 to access protected content 200.

In a preferred embodiment of the present invention, consumer 110 purchase decisions are driven from an HTML offer page 508. This page will include permit descriptions and links to specific permit order pages 510. Consumers 110 may link to a specific offer page while browsing a vendor's web site or from link 230 included in container 100.

In a first method, consumer 110 navigates vendor web site 506. Consumer 110 finds the protected content, and accesses an offer for protected content 200 at offer page 508. Consumer 110 accepts the offer presented at offer page 508, and is directed to order page 510. At order page 510, consumer 110 completes the order form to begin the process of acquiring permit 410.

Alternatively, consumer 110 may be referred to offer page 508 when attempting to access container 100 directly. Consumer 110 may obtain a copy of container 100 and attempt to access protected content 200. In this scenario, container 100 includes link to access rights data 230, as described above. The link to access rights data 230 directs consumer 110 to a place on the Internet where the access to rights may be acquired. When consumer 110 selects container 100, link to access rights data 230 redirects consumer 110 to the location specified by the link to access rights data 230. Offer URL 502 is stored both as a container 100 attribute and optionally, incorporated within the HTML (or other suitable language) presentation. When a user without permit 410 necessary to access protected content 200 attempts to access the content, the user is redirected to web page 505 specified by offer URL 502. Web page 505 denies consumer 110 access to protected content 200, and provides a link to offer page 508.

Permit Creation

Each DRM architecture system has an associated process for permit 410 creation and installation at the device of consumer 110. The process for creating and installing permit 410 is defined by the vendor of the particular DRM architecture. Typically, identifying information is read from the device of consumer 110. The consumer device identifying information is passed to clearing house 120 when a new permit 410 is requested. Preferably, the consumer device identifying information is used to generate permit 410 that is unique to the particular device of consumer 110.

A DRM server, or permit server 412, generates permit 410 according to the particular implementation of the DRM architecture associated with the server. Permit 410 is generated from a particular permit class 414. Permit classes define which permit 410 will enable a consumer to access protected content 200. In order to generate permit 410, permit server 412 must receive a request to generate permit 410 with the associated permit class 414. The various DRM architectures use different nomenclature to describe permits and permit classes, but essentially, permits are used by consumers to access protected content, and permit classes are used to define the permits required to access protected content.

After clearing house 120 has generated permit 410, permit 410 is returned to consumer 110 or sponsor 190, depending on the scenario. Preferably, clearing house 120 transmits a download and install permit URL ("install permit URL") electronically via the Internet or in an email message. The install permit URL identifies a location, preferably at a web site of clearing house 120 where consumer 110 may download and install permit 410. Typically, consumer 110 accesses the install permit URL, and a permit file is retrieved according to the particular DRM architecture of permit 410, thereby installing, or binding, permit 410 to the consumer device.

Permit Acquisition

Permit acquisition is the process by which consumer 110 obtains permit 410. The particular process of acquiring permit 410 is called a permit transaction. Parties to a permit transaction, or entities, in addition to the permit transaction define a particular scenario. A scenario is a combination of steps and entities that define the process of consumer 110 acquiring permit 410 from clearing house 120. Although consumer 110 acquires permit 410, and clearing house 120 generates or creates permit 410, there may be other entities, such as content providers 130, content packager 140 or web retailer 170 involved in the permit transaction. These other entities (i.e., an entity other than consumer 110 and clearing house 120) are collectively referred to herein as sponsor 190.

Figure 6:
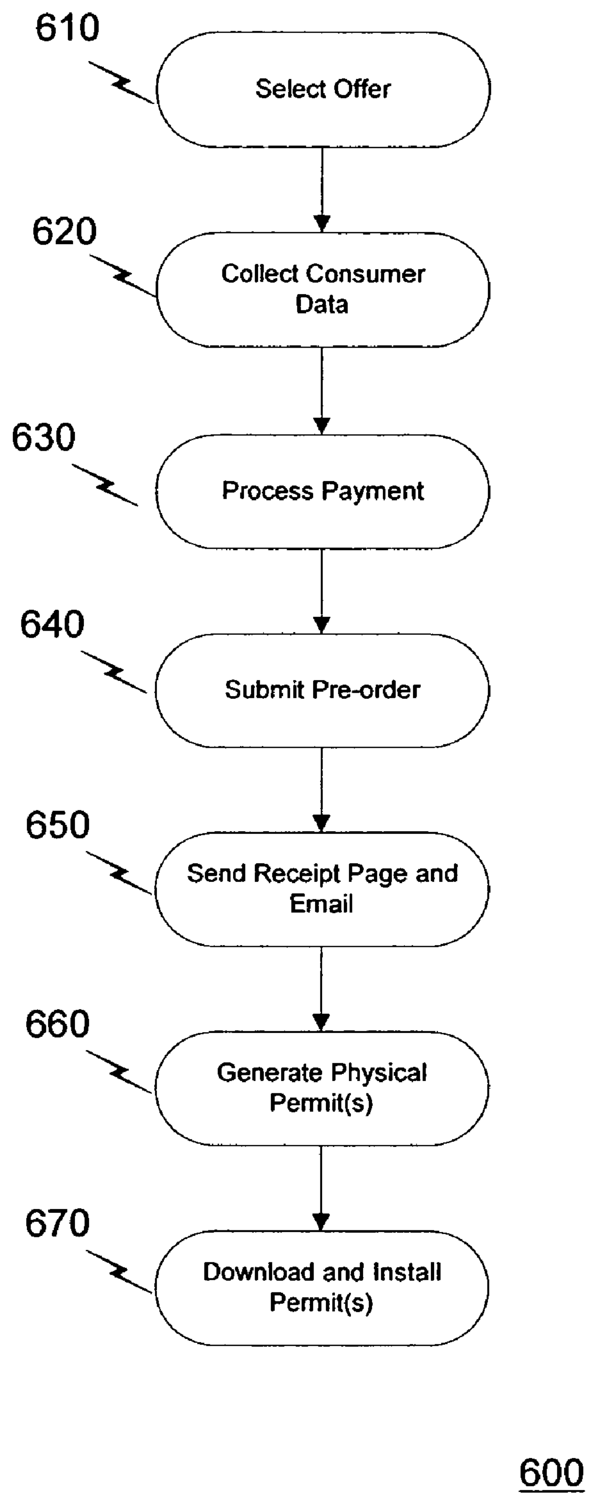
FIG. 6 illustrates the operation of issuing permits according to various embodiments of the present invention.

FIGS. 6–13 illustrate communications to affect each of the supported permit transactions and scenarios. FIG. 6, illustrates a process 600, by which consumer 110 obtains permit 410 generated by clearing house 120. Process 600 may include select offer step 610, collect consumer data step 620, process payment step 630, submit permit pre-order step 640, send receipt page and email step 650, generate physical payment step 660 and download and install permit step 670.

It should be understood, however, that steps 610–670 represent only a possible permit transaction. The steps required in a permit transaction are defined by the particular scenario, and are not necessarily represented by all the steps of process 600. For example, a scenario may exist where consumer 110 acquires a permit directly from clearing house 120. In this hypothetical scenario, sponsor 190 submits a permit pre-order in step 640, clearing house 120 generates the physical permits in step 660, and consumer 110 downloads and installs the permit in step 670. In this scenario, only steps 640, 660, and 670 are required to complete the permit transaction. Moreover, the entities performing steps 610–670 are scenario dependent. Sponsor 190, clearing house 120 and consumer 110 perform steps 610–670 according to a particular scenario, as described below.

Process 600, and more specifically, steps 610–670 illustrate the principal communications for permit transactions. Each of steps 610–670 are divided into their component messages among participating entities as illustrated in FIGS. 7–13.

With respect to these scenarios, consumer 110 receives permit 410 and sponsor 190 (e.g., typically one of content provider 130, content packager 140, and/or web retailer 170) authorizes issuance of permit 410. Data collector is a subsystem that collects non-payment information (e.g., demographic information) from consumer 110. Payment collector is a subsystem that collects payment information from consumer 110 resulting in consumer 110 being charged in any of a variety of ways, and permit creator (e.g., clearing house 120) creates and delivers permit 410.

All of the scenarios described below follow a similar pattern of events as illustrated in process 600. The scenarios differ according to which participant performs steps 620–650 to the extent that they are performed at all.

In a step 610, consumer 110 indicates his interest in obtaining permit 410 by selecting an offer. Essentially, external "offers" to purchase rights to protected content are defined and offered to consumer 110. An example of an offer page is described above as offer page 508. A number of entities may make the offer available to consumer 110, including sponsor 190 and clearing house 120. In a preferred embodiment, the offer is defined outside container 100, preferably at a location on the Internet. However, in alternate embodiments, the offer may be defined within container 100. Consumer 110 will have navigated to a specific offer(s) information page, either directly, by way of a home page in container 100, or by way of the offer dialog 505 from offer URL 502. As a result of this navigation, consumer 110 is preferably informed about the privileges and obligations (cost and/or data collection) associated with obtaining permit 410. The operation of step 610 is discussed in further detail below.

In an optional step 620, consumer 110 has browsed the web site of sponsor 190 and has decided to request permit 410. In response to the request, consumer 110 may be asked to provide certain consumer demographic data via, for example, an HTML form which may be subsequently collected and saved in an order database. Once the response is received, the sponsor returns a page to consumer 110 that directs consumer 110, preferably automatically, to the payment collector subsystem. If step 620 is performed by the sponsor and clearing house 120 is to handle consumer payment processing 630, then the flow of steps is as follows: step 620, followed by step 640, followed by step 630. Otherwise the flow if steps is as indicated in FIG. 6. The operation of step 620 is discussed in further detail below.

In an optional step 630, consumer 110 has browsed the web site of sponsor 190 and, again, has decided to request permit 410. Typically, at least one of step 620 or step 630 is performed in order for consumer 110 to obtain permit 410. In step 630, consumer 110 is directed to the payment collector subsystem, which retrieves the price and requests payment information from consumer 110. In a preferred embodiment of the present invention, a KEEPALIVE page is returned to consumer 110 that periodically requests an update from the payment collection system (This periodic request is ultimately answered with the receipt page but may be acknowledged during the transaction with a "processing . . . " page.). The order database maintains the state of the financial transaction and is updated as the financial transaction proceeds. Once approval from a payment gateway is received, the payment collector subsystem informs the permit creator of the new permit. The operation of step 630 is discussed in further detail below.

In an optional step 640, the authorizing party (content provider 130, content packager 140, web retailer 170, or clearing house 120, etc.) generates a permit pre-order and sends this information to clearing house 120. Clearing house 120 includes a subsystem, described below, that generates permits in response to permit requests. The pre-order specifies which permits 410 to issue, identifies the intended consumer 110, and remaining processing required by clearing house 120 to complete the order. Clearing house 120 will respond with an order continue URL that will allow consumer 110 to continue the transaction. Preferably, the order continue URL is an Internet address providing consumer 110 with access to permit 410. The operation of step 640 is discussed in further detail below.

In an optional step 650, a receipt page for the order that includes the order continue URL may be generated. Preferably, an e-mail, or some other form of notification, electronic or otherwise, is sent to consumer 110 if financial payment was involved in his obtaining permit 410. The operation of step 650 is discussed in further detail below.

In step 660, clearing house 120 creates permit 410 based on a permit pre-order. It should be noted that permit creation and installation is specific to a particular DRM architecture. This process is initiated when consumer 110 requests order continue URL for the first time. Subsequent requests will return the previously created permit 410 or may interact with consumer 110 to allow repurchase of the offer. Preferably, the system ensures that consumer 110 would not be required to repurchase an identical permit representing identical rights. In one embodiment of the present invention, the permit creator may message a billing system so that it may perform any billing (e.g., billing sponsor 190) associated with permit delivery. In a preferred embodiment, clearing house 120 tracks and audits permit and permit class activity to perform billing and payment against sponsor 190.

In a step 670, consumer 110 clicks on the order continue URL. After it is downloaded and installed, permit 410 is automatically registered by rights enforcement engine 320. Once permit 410 is registered, protected content 200 may be accessed (i.e., rendered, displayed, etc.) by consumer 110. The operation of steps 660 and 670 are discussed in further detail below.

FIGS. 7–13 are protocol diagrams further illustrating permit transaction steps 610–670 of process 600. The protocol diagrams of FIGS. 7–13 illustrate the sequence of messages and events between entities performed to execute steps 610–670 of process 600. The sequence of messages and events between entities are called protocol steps. Each of the protocol diagrams of FIGS. 7–13 illustrate the sequence of protocol steps to complete one of the steps of a permit transaction. The sequence of messages occur between multiple entities, each of which is a party to the permit transaction.

Figure 7:
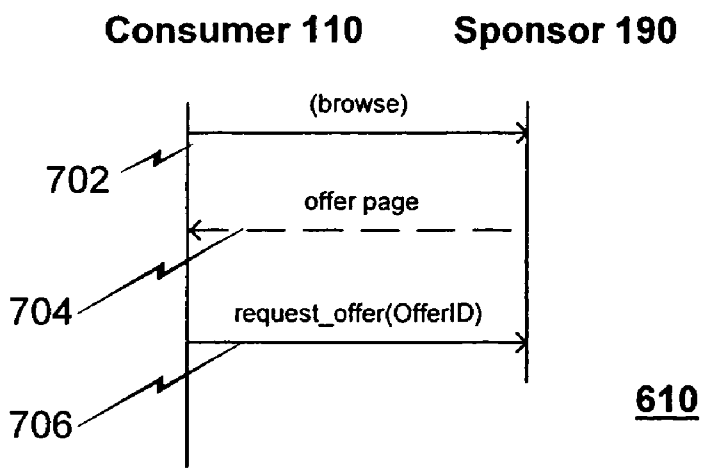
FIG. 7 illustrates the operation of a selecting offer step according to one embodiment of the present invention.

FIG. 7 is a protocol diagram further illustrating select offer step 610. In protocol step 702, consumer 110 browses to the web site of sponsor 190. At the web site of sponsor 190, consumer 110 requests offer page 508 or, alternatively, accesses offer page 508 through offer URL 502. In browse protocol step 702, consumer 110 requests offer page 508. Sponsor 190 responds to the request of browse protocol step 702 with offer page 508 at protocol step 704. Preferably, sponsor 190, in offer page protocol step 704, returns the HTML representing offer page 508. In offer page protocol step 704, sponsor 190 transmits offer page 508 to consumer 110, where offer page 508 is rendered on the browser of consumer 110.

After offer page protocol step 704, when consumer 110 decides to accept the offer of offer page 508, the protocol diagram of FIG. 7 continues at request offer protocol step 706. In request offer protocol step 706, consumer 110 chooses to accept the offer of offer page 508, and order permit 410. A request offer message from consumer 110 to sponsor 190 manifests the acceptance of offer page 508 in request offer protocol step 706. Preferably, the message of request offer protocol step 706 includes an "offer ID" identifying the particular offer accepted by consumer 110. Sponsor 190 receives the request offer message at request offer protocol step 706, and prepares an order page for transmission to consumer 110.

Figure 8:
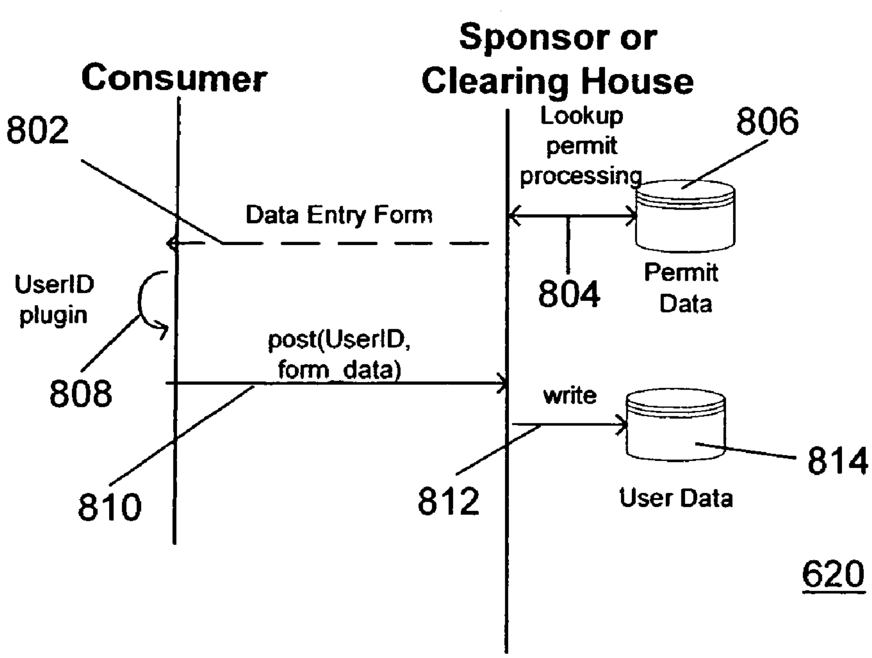
FIG. 8 illustrates the operation of a collecting consumer data step according to one embodiment of the present invention.

FIG. 8 illustrates a protocol diagram further describing collect consumer data step 620 of process 600. At collect consumer data step 620, consumer 110 has requested order page 510. The protocol diagram of collect consumer data step 620 begins at permit lookup protocol step 804. In request offer protocol step 706, consumer 110 has passed the offer id identifying the particular permit 410 desired. In permit lookup protocol step 804, clearing house 120 or sponsor 190 looks up the particular details of the permit order requested by consumer 110 so that order page 510 may be generated. Permit and order data are stored in permit data database 806. In permit lookup protocol step 804, clearing house 120 or sponsor 190 generates the data entry form, preferably order page 510, and prepares it for consumer 110. After permit lookup protocol step 804, collect consumer data step 620 continues at data entry form protocol step 802.

In data entry form protocol step 802, sponsor 190 or clearing house 120 transmits a data entry form, preferably order page 510, to consumer 110. Depending on the particular scenario, either clearing house 120 or sponsor 190 can transmit the data entry form in data entry form protocol step 802. Preferably, order page 510 is transmitted from clearing house 120 or sponsor 190 to consumer 110 via the Internet and viewed via browser 305.

Collect consumer data step 620 continues at userID plug-in protocol step 808. In userID plug-in protocol step 808, consumer 110 provides the device identifying information uniquely identifying the device of consumer 110. UserID plug-in protocol step 808 is dependent upon the particular DRM architecture for implementation. After consumer 110 has provided the device identifying information at userID plug-in protocol step 808, collect consumer data step 620 continues at post protocol step 810.

In post protocol step 810, consumer 110 transmits completed order page 510, including consumer data, and userID from userID plug-in protocol step 808 to clearing house 120 or sponsor 190. In a preferred embodiment, consumer data and userID transmitted in post protocol step 810 is sent via the Internet in an HTML "post" operation. After clearing house 120 or sponsor 190 receives the consumer data and device identifying information transmitted in post protocol step 810, collect consumer data step 620 continues at write protocol step 812.

In write protocol step 812, clearing house 120 or sponsor 190 writes the data received in post protocol step 810 to user data database 814. User data database 814 stores device identifying information and consumer data transmitted from consumer 110 to clearing house 120 or sponsor 190. Collect consumer data step 620 is completed with the completion of write protocol step 812.

Figure 9:
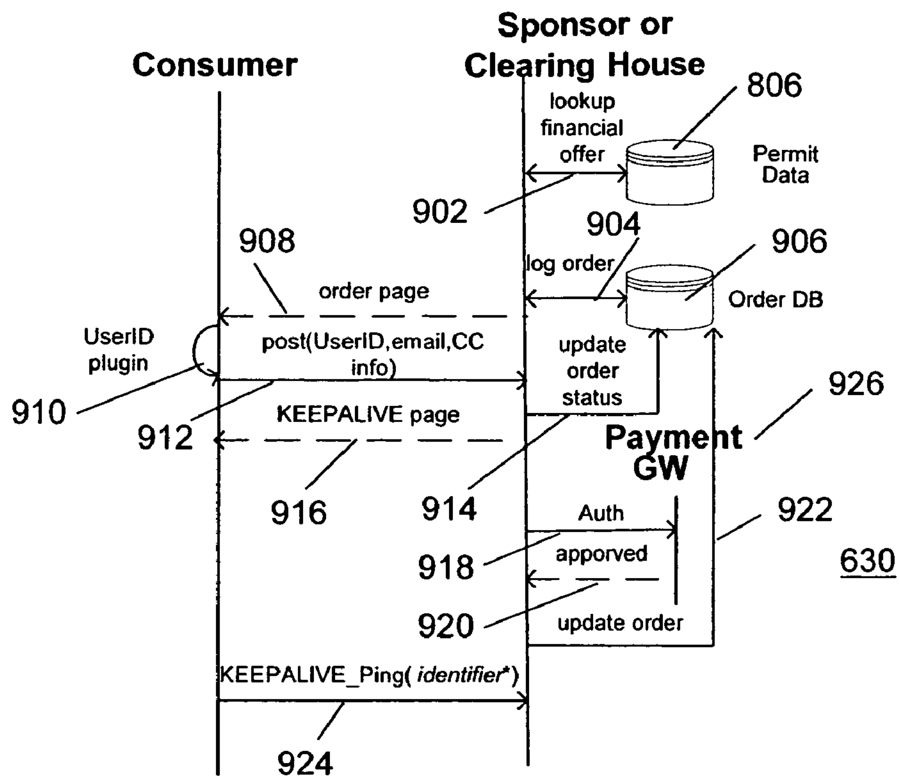
FIG. 9 illustrates the operation of a process payment step according to one embodiment of the present invention.

FIG. 9 illustrates a protocol diagram further illustrating process payment step 630. The protocol steps of process payment step 630 begin at look-up financial order protocol step 902. In look-up financial order protocol step 902, clearing house 120 or sponsor 190 reads the information associated with a particular permit 410 offer. The information associated with a particular permit 410 offer such as permit class, permit cost, and other order information is stored in permit data database 806. After look-up financial order protocol step 902, process payment step 630 continues at log order protocol step 904.

In log order protocol step 904, clearing house 120 or sponsor 190 writes the offer information read in look-up financial offer protocol step 902 to order database 906. Order database 906 stores information associated with the order of consumer 110 for permit 410. Financial offer data from look-up financial protocol step 902 is written to order database 906 to track the permit transaction of process payment step 630. After financial offer information is written to order database 906 in protocol step 904, clearing house 120 or sponsor 190 generates order page 510 from the offer data. Preferably, order page 510 is an HTML page viewable at the browser of consumer 110. After order page 510 is generated, clearing house 120 or sponsor 190 transmits order page 510 to consumer 110 in order page protocol step 908.

In order page protocol step 908, sponsor 190 or clearing house 120 transmits order page 510 to consumer 110. After consumer 110 receives order page 510 transmitted in order page protocol step 908, consumer 110 completes order page 510 in user ID plug-in protocol step 910. In user ID plug-in step 910, consumer 110 provides consumer payment information, such as e-mail address, credit card information, a unique user ID, and other information associated with processing a payment via the Internet. After consumer 110 completes order page 510 in user ID plug-in step 910, consumer 110 transmits process payment information as completed in user plug-in step 910 to clearing house 120 or sponsor 190 in process payment post protocol step 912.

Clearing house 120 or sponsor 190 receives the process payment information posted by consumer 110 in process payment post protocol step 912. Information sent via the form in process payment post protocol step 912 is preferably sent via an HTML post operation. At this point, clearing house 120 or sponsor 190 writes the additional information received from consumer 110 in process payment post protocol step 912 to order database 906 in update order status protocol step 914.

Clearing house 120 or sponsor 190 writes process payment information received in protocol step 912 to order database 906 in update order status protocol step 914. Order database 906 includes information describing the order for permit 410. The order information in order database 906 preferably includes information describing the order, the permit transaction, and information necessary to generate a permit in fulfillment of the order. Process payment information is written to order database 906 so that the progress of the permit transaction may be tracked. After update order status protocol step 914, or concurrently with protocol step 914, clearing house 120 or sponsor 190 submits a payment authorization request to payment gatetway 926 in authorization protocol step 918.

In authorization protocol step 918, clearing house 120 or sponsor 190 requests a payment authorization from payment gateway 926 so that payment from consumer 110 for permit 410 may be validated prior to delivery of permit 410. Payment gatetway 926 responds to authorization protocol step 918 with approval protocol step 920. Approval protocol step 920 notifies clearing house 120 or sponsor 190 of approval or denial of the request from authorization protocol step 918. After clearing house 120 or sponsor 190 receives the authorization or denial from approval protocol step 920, permit transaction information is updated in update order protocol step 922. In the case of an approval received in approval protocol step 920, permit transaction information written in update order protocol step 922 reflects the approval. If, on the other hand, a denial is received in approval protocol step 920, update order protocol step 922 writes the denial to order database 906.

During protocol steps 914, 918, 920, and 922 KEEPALIVE pages are passed between consumer 110 and clearing house 120 or sponsor 190 in KEEPALIVE protocol steps 916 and 924. KEEPALIVE protocol steps 916 and 924 pass information between consumer 110 and clearing house 120 or sponsor 190 in order to maintain the transaction connection, and thereby the permit transaction, between the two entities. This ensures that any latency or delay involved with payment authorization through payment gatetway 926 does not cause the permit transaction to fail.

Figure 10:
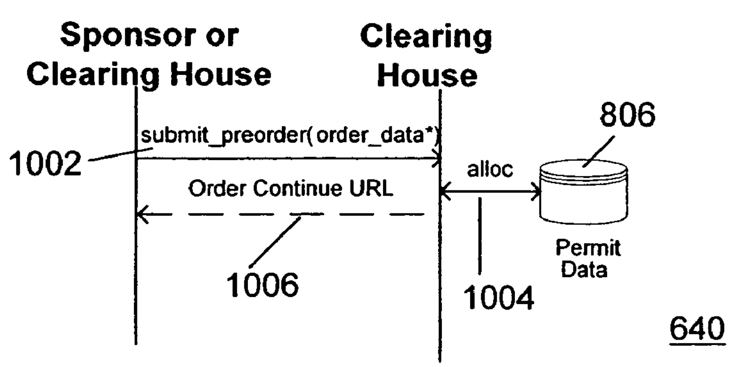
FIG. 10 illustrates the operation of a submit permit pre-order step according to one embodiment of the present invention.

FIG. 10 illustrates the protocol diagram associated with submit permit pre-order step 640. In step 640, the authorizing party (content provider 130, content packager 140, web retailer 170, or clearing house 120, etc.) generates a permit pre-order and sends this information to clearing house 120. The pre-order specifies which permits 410 to issue, identifies the intended consumer 110, and remaining processing required by clearing house 120 to complete the order. Clearing house 120 will respond with a URL that will allow consumer 110 to continue the transaction.

Submit permit pre-order step 640 begins with submit pre-order protocol step 1002. The pre-order is essentially a message to clearing house 120 including a request that permit 410 be generated and issued to consumer 110. After clearing house 120 receives the pre-order of submit pre-order protocol step 1002, submit permit pre-order step 640 continues at allocation protocol step 1004.

Allocation protocol step 1004 validates the pre-order information received in protocol step 1002 against permit data database 806. Validation includes verifying the permit class, and other order information associated with the pre-order request of protocol step 1002. After validation, submit permit pre-order step 640 continues at protocol step 1006.

Clearing house 120 transmits the URL such as the order continue URL described above, in order continue URL protocol step 1006. The order continue URL is an address returned by clearing house 120 to sponsor 190 signaling that the order is valid and will get processed by clearing house 120. Alternatively, if the order of allocation protocol step 1004 is not valid, the order continue URL will not be returned, thereby signaling a failed or invalid order.

Figure 11:
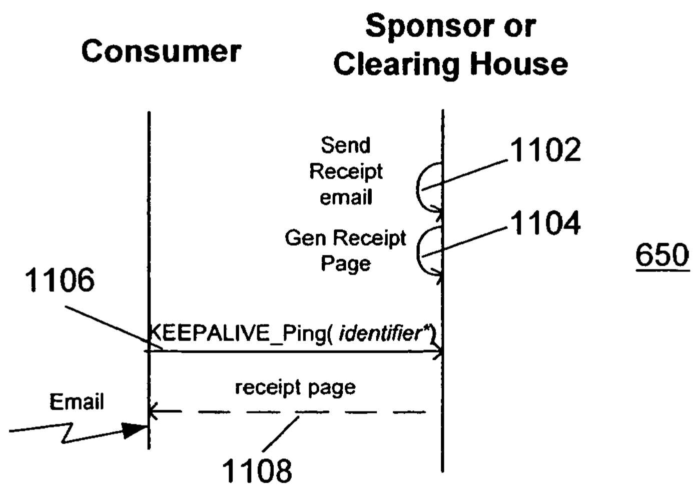
FIG. 11 illustrates the operation of a send receipt page and email step according to one embodiment of the present invention.

FIG. 11 is a protocol diagram further illustrating send receipt page and e-mail step 650. In step 650, a receipt page for the order that includes the order continue URL may be generated. Preferably, an e-mail is sent to consumer 110 if financial payment was involved in acquisition of permit 410.

In send receipt e-mail protocol step 1102 clearing house 120 generates a receipt e-mail for eventual transmission to consumer 110. In a scenario where sponsor 190 will eventually be sending the receipt e-mail to consumer 110, the receipt e-mail is sent from clearing house 120 to a sponsor 190 at send receipt e-mail protocol step 1102. Clearing house 120 or sponsor 190 generates the receipt page for transmission to consumer 110 at generate receipt page protocol step 1104. The receipt page generated at generate receipt page protocol step 1104 includes payment transaction information generated at process payment step 630. The receipt is generated in order to provide information about the financial transaction associated with the permit transaction to consumer 110.

During the send receipt page and e-mail step 650 process, consumer 110 continues to send a KEEPALIVE page, or message, to clearing house 120 or sponsor 190 in order to avoid a timeout of the permit transaction. Receipt page protocol step 1108 transmits the generated receipt page from clearing house 120 or sponsor 190 to consumer 110 after generate receipt page protocol step 1104. In a preferred embodiment, the receipt page of protocol step 1108 is transmitted via Simple Mail Transfer Protocol (SMTP) e-mail.

Figure 12:
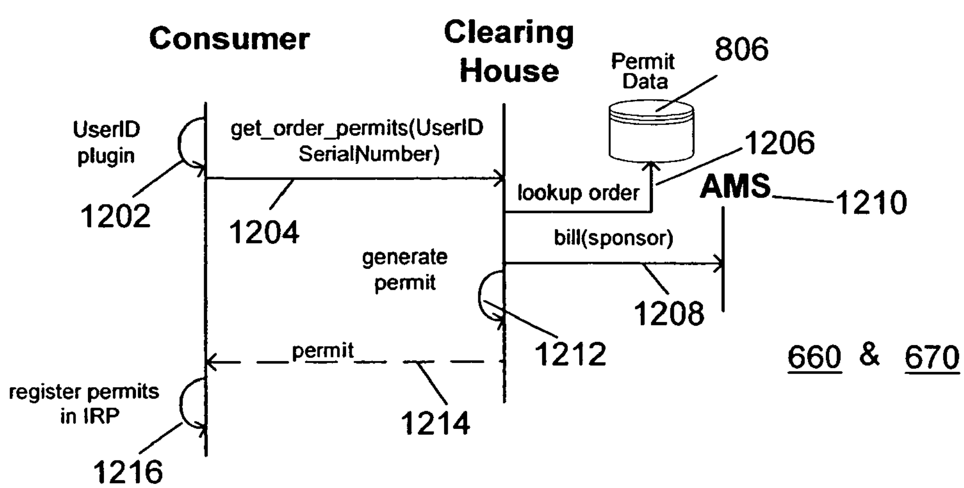
FIG. 12 illustrates the operation of a generate physical permit step according to one embodiment of the present invention.
Figure 13:
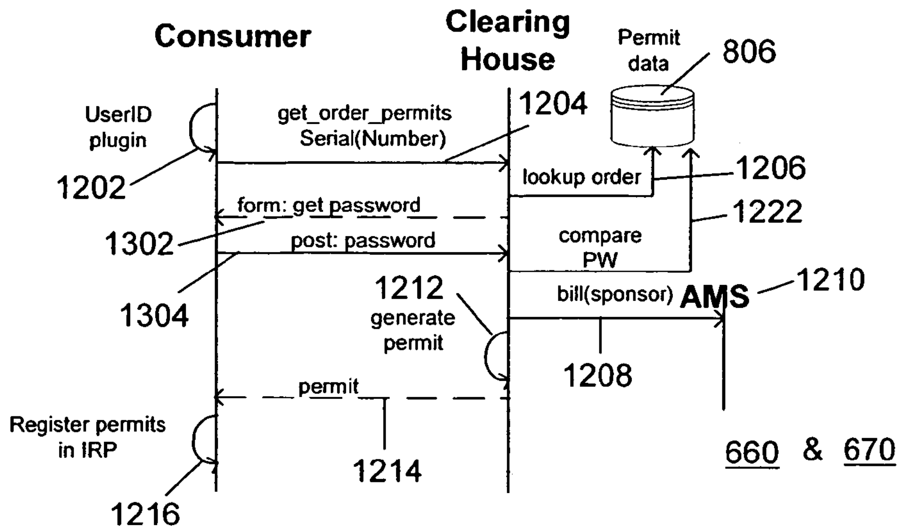
FIG. 13 illustrates the operation of a generate physical permit step according to one embodiment of the present invention.

FIG. 12 and FIG. 13 are protocol diagrams illustrating the protocol steps of generate physical permit step 660 and download and install permit step 670. FIGS. 12 and 13 represent alternate embodiments of steps 660 and 670. The protocol diagram of FIG. 12 differs from the protocol diagram of FIG. 13 in that the protocol diagram of FIG. 13 includes a password validation step. The protocol diagram of FIG. 12 is described, and the additional step of FIG. 13 is described.

Generally, in step 660, clearing house 120 creates permit 410 based on a permit pre-order. It should be noted that permit creation and installation is specific to a particular DRM architecture. In a step 670, consumer 110 clicks on the order continue URL (the first request will initiate step 660 above). After it is downloaded and installed, permit 410 is automatically registered by viewer 300 in rights enforcement engine 320. Once permit 410 is registered, protected content 200 may be accessed (i.e., rendered, displayed, etc.) by consumer 110.

Generate physical permit step 660 and download and install permit step 670 begin at userid plug-in protocol step 1202. In userid plug-in protocol step 1202, consumer 110 provides consumer identifying information and consumer device identifying information associated with a particular permit transaction. Clearing house 120 use the consumer identifier and consumer device identifying information identify to generate permit 410. The process for creating and installing permit 410 is defined in accordance with the particular DRM architecture. Typically, information is read from the device of consumer 110. The consumer device identifying information is passed to clearing house 120 when a new permit 410 is requested. Preferably, the consumer device identifying information is used to generate permit 410 that is unique to the particular device of consumer 110.

Consumer 110 transmits the consumer identifier and consumer device identifying information to clearing house 120 in get order permits protocol step 1204. Clearing house 120 looks up the permit transaction order information in lookup order protocol step 1206. The consumer identification and consumer device identifying information received in protocol step 1204 allow clearing house 120 to uniquely identify and generate permit 410 needed by consumer 110. Clearing house 120 looks up the order information in permit data database 806. After clearing house 120 has identified the particular order and associated order information in protocol step 1206, clearing house 120 submits a bill to sponsor 190 of the permit transaction at bill protocol step 1208.

In bill protocol step 1208, clearing house 120 bills sponsor through an account management system ("AMS") 1210. AMS 1210 is a subsystem of clearing house 120 that tracks all permit transactions, orders for permits, billing, and permit generation activity. AMS 1210 allows clearing house 120 to audit, report and bill for all permit and permit class activity. After clearing house 120 has submitted the in bill protocol step 1208, clearing house 120 generates the physical permits associated with the particular permit transaction in generate permit protocol step 1212.

Preferably, the consumer device identifying information from protocol step 1204 is used by clearing house 120 to generate permit 410 that is unique to the particular consumer device. Permit server 412, within clearing house 120, generates permit 410 according to the particular implementation of the DRM architecture. The permit server generates the permit from the particular permit class 414.

After the permit is generated in protocol step 1212, clearing house 120 transmits the permit to consumer 110 in permit transmission protocol step 1214. After consumer 110 receives the permit transmitted in permit transmission protocol step 1214, the permit is installed and registered at the device of consumer 110 in register permits protocol step 1216. Preferably, clearing house 120 transmits a download and install permit URL electronically via the Internet or in an email message to consumer 110. Typically, consumer 110 accesses the install permit URL, and a program or executable file is retrieved, and executed at the device of consumer 110, thereby installing, or binding, permit 410 to the consumer device.

FIG. 13 is an identical protocol diagram to FIG. 12, except for two additional protocol steps of verifying the password of consumer 110. If the particular permit transaction or scenario includes the verification of a password before permits are generated and downloaded, get password protocol step 1302 and 1304 are required in generate physical permit step 660 and download and install permits step 670.

Clearing house 120 generates a password request form and transmits it to consumer 110 in get password protocol step 1302. Preferably, the password request form is an HTML form transmitted via the Internet. Consumer 110 receives the password request form of get password protocol step 1302, and views it in a browser. After completing the password request form with the correct password, consumer 110 transmits the password to clearing house 120, preferably via an HTML post operation.

DRM Agnostic Clearing House

As explained above, multiple, incompatible DRM architectures pose a number of problems to data rights management. The present invention those solves problems, and offers a number of new benefits by providing a DRM agnostic clearing house. A DRM agnostic clearing house incorporates multiple DRM architectures into a single clearing house for generating and managing permit classes, permits and permit offers.

More specifically, the DRM agnostic clearing house is a system that incorporates multiple DRM servers, such as permit server 412. The interfaces to the DRM servers are abstracted so that the functionality of generating permit classes and permits for each type of DRM server is incorporated in a single, DRM agnostic clearing house. From the DRM agnostic clearing house, a consumer may acquire any permit for which a DRM server has been incorporated. For example, if both Microsoft™ and Adobe Systems™ DRM servers have been incorporated into the DRM agnostic clearing house, the clearing house may generate and issue permits and permit classes for content protected by either the Microsoft™ or Adobe Systems™ DRM architecture.

Figure 21:
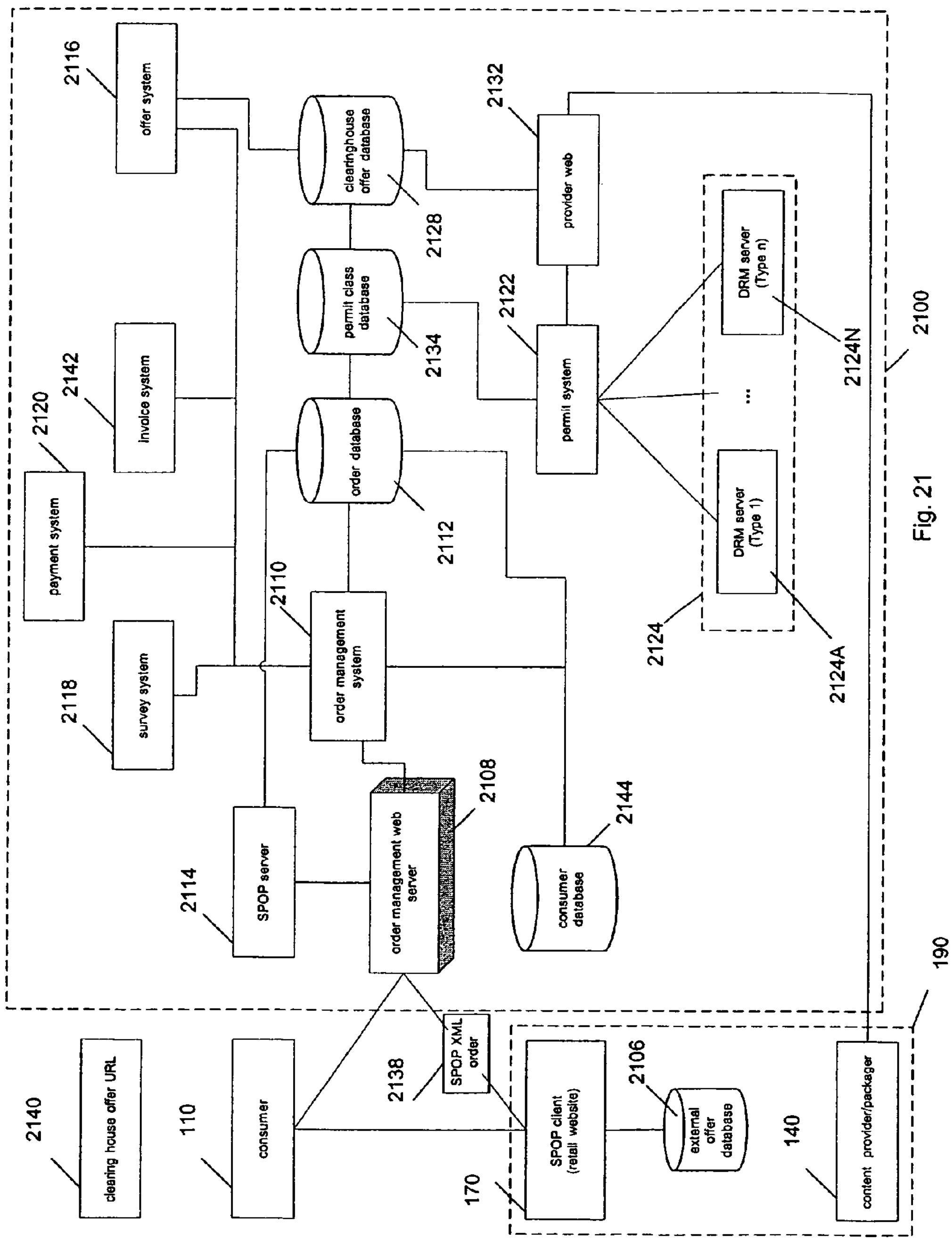
FIG. 21 illustrates an example of a DRM agnostic clearing house.

FIG. 21 illustrates an example of a drm agnostic clearing house 2100. In general, a DRM agnostic clearing house is a clearing house that supports multiple DRM architectures. Clearing house 2100 includes a number of elements useful to implementing a DRM agnostic clearing house as described above. Clearing house 2100 may include an order management web server 2108, an SPOP server 2114, a survey system 2118, a order management system 2110, a payment system 2120, an invoice system 2142, an offer system 2116, an order database 2112, a permit class database 2134, a clearing house offer database 2128, a permit system 2122, a provider web 2132, DRM servers 2124, and DRM servers 2124A–2124N.

FIG. 21 illustrates logical connections between the various components of clearing house 2100. In one embodiment, these connections between clearing house components represent application programming interfaces (APIs). It should be noted, however, that some connections between components are shown as common for ease of comprehension. Based on the following descriptions, the components of clearing house 2100 interact in a manner to carry out the functions and features of the DRM agnostic clearing house.

Clearing house 2100 provides a platform for DRM agnostic packaging. DRM agnostic packaging offers a number of benefits over conventional packaging systems. Permit classes for packaging are stored and managed centrally, enabling distributed packaging by multiple content packagers, such as content packager 140.

Clearing house 2100 of the present invention generates permits 410, permit classes 414, and enables packaging for multiple DRM architectures. Clearing house 2100 insulates content providers 130, packagers 140 and consumers 110 from the incompatibilities and difficulties of multiple DRM architectures.

Clearing house 2100 functions across multiple DRM architectures by incorporating multiple incompatible DRM servers 2124A–2124N. DRM servers 2124A–2124N are instances of permit server 412 that operate according to a specific DRM architecture. Examples of such incompatible DRM servers 2124 are DRM servers from Intertrust™, Microsoft™, Adobe Systems™, Preview Systems™, Xerox Corporation™, and IBM™. The interfaces to each of DRM servers 2124 are abstracted so that the functionality of generating permit classes and permits is incorporated into in a single uniform interface. Clearing house 2100 uses the uniform interface to issue requests to DRM servers 2124A–2124N for permits and permit classes. In a preferred embodiment, the interfaces of DRM servers 2124 are abstracted using the Common Object Request Broker Architecture (CORBA) Interface Definition Language (IDL). A CORBA IDL interface is implemented for each of DRM servers 2124A–2124N, thereby providing a consistent, and uniform interface for each of DRM servers 2124 to the rest of the system of clearing house 2100.

Consumer 110 may acquire any permit 410 for which a DRM server has been incorporated within clearing house 2100. For example, if both Microsoft™ and Adobe Systems™ DRM servers have been incorporated into clearing house 2100, clearing house 2100 may generate and issue permits 410 and permit classes 414 for content packaged or protected by either the Microsoft™ or Adobe Systems™ DRM architecture. A discussion of the functionality in conjunction with the particular components, features and design of clearing house 2100 is discussed below.

DRM Agnostic Packaging

The process of protecting content container 100 is called "packaging." Generally, content is packaged by content packager 140. Often, content providers 130 package the content before providing it to consumer 110, or third parties, such as web retailer 170. In the packaging process, content is packaged with a packaging tool. Typically, a packaging tool takes content, some form of content access rules 220, permit class 414 and creates container 100 including protected content 200. Once protected content 200 has been packaged within container 100, a consumer 110 must acquire access rights that content.

Content packagers 140 package content according to a particular DRM architecture. In order to package content, content packager 140 must obtain permit class 414 from the particular DRM server, such as permit server 412, that will eventually generate permit 410 used to access protected content 200. Permit class 414 defines which permit 410 will enable consumer 110 to access protected content 200 packaged with permit class 414. DRM servers 2124 generate permits 410 and create permit classes 414. Using permit class 414, content packager 140 is able to create container 100 including protected content 200 accessible only to consumer 100 with permit 410 associated with permit class 414.

Clearing house 2100 is able to generate permit classes 414 for multiple DRM architectures, thereby enabling DRM agnostic packaging. DRM agnostic packaging is enabled because packager 140 may request permit class 414 for whichever DRM architecture it is packaging under. DRM agnostic packaging results in a number of benefits.

First, clearing house 2100 allows for distributed packaging of content multiple content packagers, such as content packager 140 to reference identical permit class 414. Distributed packaging of content allows multiple packaging tools to package content using the same permit class. Clearing house 2100 also solves the problem of packaging content across multiple DRM architectures. Often, content packager 140 is forced to choose a particular DRM architecture because of the type of content (e.g., a music specific DRM architecture), an existing relationship with the content provider, or some other reason. Content packager 140, therefore, is often forced to deal with multiple DRM systems and servers to package content for different DRM architectures. Because clearing house 2100 supports multiple DRM architectures, content packager 140 need only access clearing house 2100 to package content. The operation of DRM agnostic packaging is described below, first in from the perspective of content packager 140, then from the perspective of clearing house 2100.

DRM agnostic packaging begins when content packager 140 wishes to package content. Content provider 140 submits a request for permit class 414 to clearing house 2100. Although a request may be specific to a particular DRM architecture, generally the request includes meta data identifying the particular permit class 414 and content meta data describing the nature of the content to be packaged. The request is submitted to provider web 2132. Provider web 2132 is an interface, preferably a web interface, to clearing house 2100. Provider web 2132 receives requests for permit class 414 and supplies permit class 414 in response. Content provider 140 receives permit class 414 and a unique identifier of permit class 414 from provider web 2132. The unique identifier allows content packager 140 to identify the particular permit class 414 to be used to package the content. Typically, content packager 140 provides the unique identifier when requesting an instance of permit class 414, however, if a new permit class must be created by clearing house 2100, a new unique identifier is created.

After content packager 140 receives permit class 414, the packaging tool packages the content into container 100 for protection and distribution, according to the particular DRM architecture of permit class 414.

Clearing house 2100 begins the DRM agnostic packaging process when provider web 2132 receives the permit class request from content packager 140. In a preferred embodiment, the permit class request is an Extensible Markup Language (XML) message transmitted via the Internet, although other mechanisms could be used as would be appropriate. The permit class request identifies a particular permit class 414 sought by content packager 140. Provider web 2132, in turn, requests permit class 414 from permit system 2122. Permit system 2122 is the interface to DRM servers 2124. In an alternate embodiment, however, provider web 2132 may access DRM servers 2124 directly. Provider web 2132 requests permit class 414 from permit system 2122, and permit system 2122 first determines if permit class 414 requested exists.

Permit classes known to clearing house 2100 (i.e., permit classes that exist within clearing house 2100) are stored in permit class database 2134, preferably according to their descriptions. Preferably, permit class database 2134 stores each permit class created on clearing house 2100 by DRM servers 2124. Additionally, permit class database 2134 may be "seeded" with additional permit classes from other DRM servers, or clearing house systems. Permit system 2122, upon receiving the request for a new permit class 414 from provider web 2132, checks permit class database 2134 to determine if permit class 414 already exists. If permit class 414 already exists, permit system 2122 retrieves permit class 414 from permit class database 2134, and passes it to provider web 2132, in fulfillment of the request.

If permit class 414 requested by content packager does not exist in permit class database 2134, permit system 2122 submits a request to generate a new permit class 414 to one of DRM servers 2124. Permit system 2122 accesses the one of DRM servers 2124 corresponding to the DRM architecture associated with the request, preferably through a CORBA IDL interface, and requests that permit class 414 be generated. One of DRM servers 2124 responds to the request for permit class 414, and generates permit class 414 according to the DRM architecture specific implementation of permit classes. Once generated, permit class 414 is returned to permit system 2122.

Permit system 2122 "registers" the new permit class 414 in permit class database 2134. Registering permit class 414 in permit class database 2134 means that permit class 414 in permit class database 2134 may be retrieved in response to a subsequent request to permit system 2122. After storing new permit class 414 in permit class database 2134, permit system 2122 sends permit class 414 and a unique permit class identifier to provider web 2132. Provider web 2132, in turn, responds to the permit class request of content packager 140 with permit class 414 and a unique permit class identifier. The unique permit identifier allows content packager 140 to request the same permit class again, or provide the unique permit identifier to other entities, so they might package content with permit class 414, or generate permits for content packaged with permit class 414. Once it is received, content packager 140 may begin packaging content with permit class 414.

Figure 22:
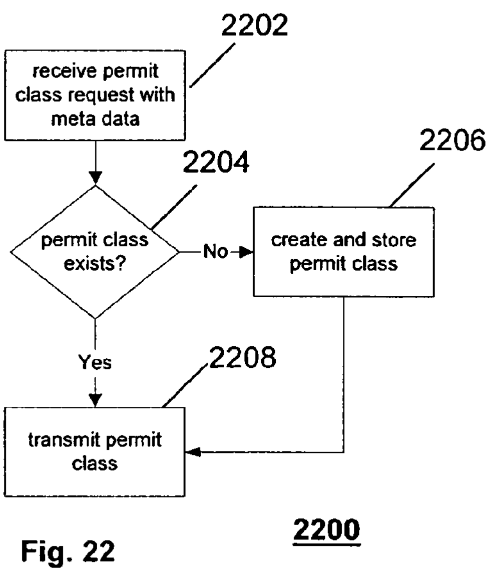
FIG. 22 illustrates the process of DRM agnostic packaging from the perspective of a clearing house.
Figure 23:
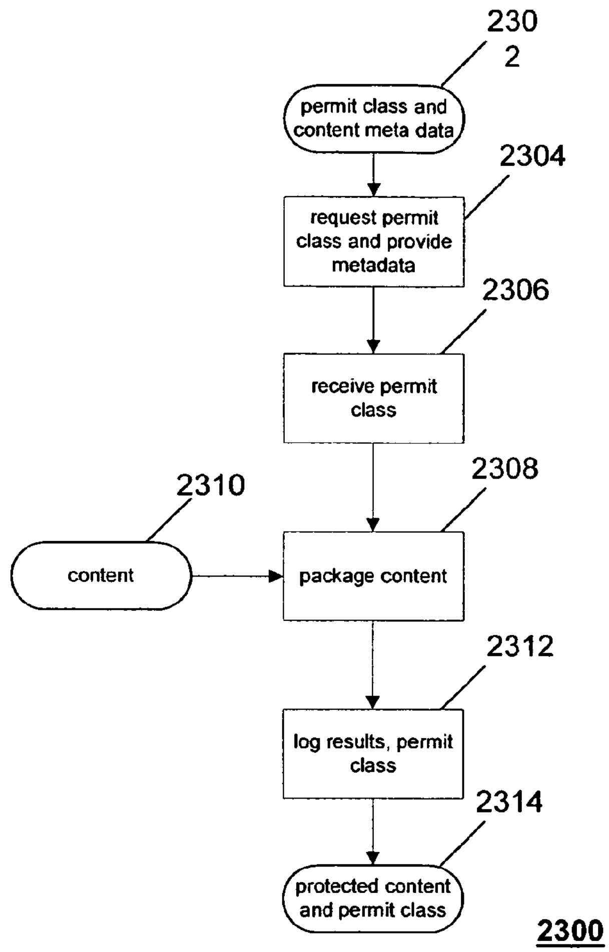
FIG. 23 illustrates the DRM agnostic packaging process from the perspective of the content packager.

FIGS. 23 and 22 further illustrate the process of DRM agnostic packaging. FIG. 23 illustrates a DRM agnostic packaging process 2300 from the perspective of content packager 140. FIG. 22 illustrates a DRM agnostic packaging process 2200 from the perspective of clearing house 2100.

The operation of DRM agnostic packaging process 2300 is now described. In a step 2302, content packager 140 receives permit class and content meta data to generate a request for a permit class to package content. Permit class and content meta data describe the nature of the content and permit class, and are generally specific to a DRM architecture. After determining permit class 414 and content meta data, content provider 140 submits a request for permit class 414 to clearing house 2100 in step 2304. This request is submitted to provider web 2132. In a step 2306, in response to this request, content provider 140 receives permit class 414 and a unique identifier of permit class 414 from provider web 2132.

In a step 2308, after content packager 140 receives permit class 414, content packager 140 uses a packager tool to package the content into container 100 for protection and distribution, according to the particular DRM architecture associated with permit class 414. In step 2312, content packager 140 logs the results of packaging step 2308, after completing packaging. Packaging process 2300 produces container 100, protected content 200, permit class 414 and any meta data associated therewith.

FIG. 22 illustrates a DRM agnostic packaging process 2200, from the perspective of clearing house 2100, which is now described. In step 2202, provider web 2132 receives a permit class request from content packager 140. The permit class request identifies the particular permit class 414 sought by content packager 140. In response to the request received in step 2202, provider web 2132 requests permit class 414 from permit system 2122.

In step 2204, permit system 2122, upon receiving the request for permit class 414 from provider web 2132, checks permit class database 2134 to determine if permit class 414 already exists. If permit class 414 already exists, permit system 2122 retrieves permit class 414 from permit class database 2134, and passes it to provider web 2132, in fulfillment of the request.

If permit class 414 requested by content packager does not exist in permit class database 2134, in step 2206 permit system 2122 submits a request to generate new permit class 414 to one of DRM servers 2124. One of DRM servers 2124 responds to the request for permit class 414, and generates the new permit class 414. Once generated, permit class 414 is returned to permit system 2122.

In step 2206, permit system 2122 "registers" the new permit class 414 in permit class database 2134 by storing it in permit class database 2134 such that future requests for permit class 414 may be serviced out of the database. After storing new permit class 414 in permit class database 2134, permit system 2122 sends permit class 414 and a unique permit class identifier to provider web 2132. In step 2208, provider web 2132, in turn, responds to the permit class request of content packager 140 by transmitting permit class 414 and the unique permit class identifier. Once received, content packager 140 may begin packaging content with permit class 414.

DRM Agnostic Permit Transactions

Clearing house 2100 of FIG. 21 supports DRM agnostic permit transactions by generating permits 410 for multiple DRM architectures. From time to time, web retailer 170 may offer content packaged by different DRM architectures to consumer 110. As discussed above, this poses a problem for web retailer 170 because permit 410 is traditionally DRM architecture specific, forcing web retailer 170 to use multiple DRM systems. Clearing house 2100, however, generates permits associated with any of DRM servers 2124A–2124N.

For example, web retailer 170 provides consumer 110 with an offer to acquire the access to protected content 200 within container 100, such as offer page 508. Consumer 110 accepts the offer by fulfilling the permit acquisition terms to access protected content 200. After the permit acquisition terms have been fulfilled, web retailer 170 begins the process of generating permit 410 by submitting a request for permit 410 associated with container 100 to clearing house 2100. Specifically, permit acquisition terms define or describe how consumer 110 may acquire permit 410. Preferably, permit acquisition terms include providing consumer data (i.e., consumer 110 demographic information), payment and/or payment information, or other terms as would be apparent.

In a first embodiment, the request is bound to a particular Internet address (i.e., "URL"), shown as clearing house offer URL 2140. In a second embodiment, the request is generated dynamically by web retailer 170. A dynamically generated request is shown as Secure Permit Order Pipeline ("SPOP") XML order 2138. Although SPOP XML order 2138 may take the form of any electronic message between web retailer 170 and order management web server 2108, in a preferred embodiment SPOP XML order 2138 is formatted as an XML message. SPOP XML order 2138 is a message from sponsor 190, such as web retailer 170, requesting the generation of permit 410. SPOP XML order 2138 specifies the details and steps of the permit transaction, as discussed in further detail below. Whether the request is clearing house offer URL 2140, or SPOP XML order 2138, the permit request ultimately identifies a particular permit 410, as identified by permit class 414.

In the case of a dynamically generated permit request, web retailer 170 generates the pre-order message from external offer database 2106. Web retailer 170 uses information identifying the particular offer accepted by consumer 110 to access external offer database 2106 to find the associated details and steps of the permit transaction (i.e., permit acquisition terms). In a preferred embodiment, the details and steps of the permit transaction define the sequence of events within clearing house 2100 necessary to complete the permit transaction. For example, the type and method of payment, the number of permits to be generated, permit class 414, surveys to be generated and completed by consumer 110, invoice generation, etc., may be specified by the permit request message. Web retailer 170 collects this information and generates a pre-order message specifying the details and steps of the permit transaction.

After web retailer 170 generates the pre-order message, web retailer 170 transmits the pre-order message to order management web server 2108. The pre-order message is illustrated in FIG. 21 as SPOP XML order 2138. It should be understood, however, that the pre-order message may take the form of any electronic message, as would be apparent. SPOP XML order 2138 specifies the process of completing the permit transaction. After sending SPOP XML order 2138, web retailer 170 waits for a response from clearing house 2100 to SPOP XML order 2138. In response to the pre-order message, clearing house 2100 generates an order continue URL and transmits it to web retailer 170. Order continue URL may include requested permit 410, or specify a location from which permit 410 may be retrieved. In a preferred embodiment, and the following description, the order continue URL specifies an Internet from which consumer 110 may download and install permit 410.

Web retailer 170 receives order continue URL from clearing house 2100. In an alternate embodiment, SPOP XML order 2138 may have specified that the order continue URL be transmitted to consumer 110. Web retailer 170 provides consumer 110 with order continue URL, either by transmitting it, or presenting it as a link in a page hosted at a web page of web retailer 170. Upon accessing the order continue URL, consumer 110 is redirected to the Internet address identified therein. In a preferred embodiment, order continue URL specifies an Internet address of clearing house 2100. From the prospective of web retailer 170, the permit transaction is completed when clearing house 2100 receives a request from consumer 110 for the data at order continue URL.

When order management web server 2108 receives SPOP XML order 2138 from web retailer 170, clearing house 2100 begins the process of generating permit 410. Order management web server 2108 functions as an internet interface to sponsors 190, web retailer 170, consumer 110 and other entities interacting with clearing house 2100. Order management web server 2108 transmits and receives messages via the Internet, and forwards messages received to order management system 2110 and SPOP server 2114. Additionally, order management web server 2108 receives messages from the various components of clearing house 2100, and transmits them to entities outside of clearing house 2100 via the Internet. Order management web server 2108 is the interface for incoming pre-order messages for clearing house 2100.

Order management web server 2108 receives SPOP XML order 2138 representing the pre-order message generated by web retailer 170. In a preferred embodiment, SPOP XML order 2138 identifies the particular web retailer that transmitted the pre-order message. Order management web server 2108 forwards the received SPOP XML order 2138 to SPOP server 2114. SPOP server 2114 processes SPOP XML order 2138 messages received by clearing house 2100. SPOP server 2114 authorizes the sender and validates the pre-order message data. In a preferred embodiment, SPOP server 2114 verifies that web retailer 170 has an established relationship with clearing house 2100. An established relationship defines the terms under which web retailer 170 may pre-order messages to clearing house 2100 for permit 410. Additionally, SPOP server 2114 validates the format and content of SPOP XML order 2138 received from web retailer 170. After validating the SPOP XML order 2138, SPOP server 2114 creates an order and stores it in order database 2112.

The order in order database 2112 specifies the details and process of the permit transaction that are necessary to generate permit or permits 410. For example, the order in order database 2112 may specify the type and number of permits 410 to generate (by specifying permit class 414 associated with each permit 410) a particular payment process for consumer 110 to follow, a particular survey stored at survey system 2118 for consumer 110 to complete, an invoice to be transmitted to consumer 110 or web retailer 170 and generated by invoice system 2142, or other details of the particular permit transaction.

After SPOP server 2114 creates the order in order database 2112, order management system 2110 generates an order continue URL to be returned to web retailer 170.

The order continue URL identifies the order created in order database 2112, and the internet address described above. Order management system 2110 sends the order continue URL to order management web server 2108, which, in turn, transmits it to web retailer 170. Transmitting the order continue URL to web retailer 170 completes the SPOP XML order 2138 processing by clearing house 2100.

Consumer 110 begins the process of generating, downloading and installing permit 410 by selecting the order continue URL from order management web server 2108. In an alternate embodiment, consumer 110 is redirected to an Internet address specified by the order continue URL from a web page of web retailer 170. Order management web server 2108 receives the request for information at the internet address specified by order continue URL when consumer 110 selects it.

Order management web server 2108 receives the request from consumer 110, passes the information from the order continue URL to order management system 2110. Order management system 2110 retrieves the details of the order identified by the order continue URL. In a preferred embodiment order management system 2110 retrieves the details of the order from order database 2112. From the order details, order management system 2110 determines the steps required to generate permit or permits 410 in fulfillment of the order. Order management system 2110 submits requests to the various subsystems of clearing house 2100 to perform the remaining order processing steps, identified by the order information in order database 2112. The various remaining order processing steps may include, but are not limited to generating an invoice for transmission to consumer 110 at invoice system 2142; generating a survey for consumer 110 to complete at survey system 2118; processing payment through a payment gateway, or requesting payment from consumer 110 at payment system 2120; generating a receipt page or email for transmission to consumer 110 detailing the permit transaction or payment information; or other permit transaction steps as appropriate. The order in order database 2112 also includes the permit class or classes 414 specified in the order, allowing order management system 2110 to submit requests for permit 410 to permit system 2122.

After completion of the remaining order processing steps, order management system 2110 requests the particular permit class or classes 414 identified by the order in order database 2112 from permit system 2122. In the request, order management system 2110 specifies the permit class or classes 414 associated with permit or permits 410. Permit system 2122, in turn, submits a request to the particular DRM server 2124 identified by the DRM architecture type associated with permit class 414. In response, DRM server 2124 generates permit 410 according to the particular DRM architecture of permit class 414. DRM server 2124 returns the newly generated permit 410 to permit system 2122, and permit system 2122 returns permit 410 to order management system 2110.

Order management system 2110 determines if the order in order database 2112 includes additional permit requests. Additional permit requests are represented by additional permit classes 414 in the order. If additional permit requests exist, order management system 2110 continues to request permits 410 from permit system 2122, until all of the required permits 410 are generated. When all permits 410 associated with the order have been generated, order management system 2110 passes permits 410 to order management web server 2108. Order management web server 2108 provides permits 410 generated to consumer 110. Once the permit or permits 410 have been installed according to the particular DRM architecture of permit class 414, consumer 110 may access protected content 200.

In an alternate embodiment consumer 110 may request permit 410 by selecting clearing house offer URL 2140. Preferably, in this embodiment, clearing house offer URL 2140 is an Internet address of clearing house 2100, identifying an offer defined by clearing house offer database 2128. Clearinghouse offer database 2128 includes offers, such as offer page 508, associated with a plurality of clearing house offer URLs 2140. Upon selecting clearing house offer URL 2140, consumer 110 is directed to order management web server 2108. Information in clearing house offer URL 2140 identifies the particular offer to clearing house 2100. Order management web server 2108 sends the request to order management system 2110, which, in turn, sends the request to offer system 2116. Offer system 2116 retrieves the offer information from clearing house offer database 2128 and sends it to order management system 2110. In response, order management system 2110 creates an order in order database, as described above. Additionally, order management system 2110 generates an order continue URL and sends to order management web server 2108, which in turn, sends it to consumer 110. The rest of the permit transaction proceeds as described above, with clearing house 2100 fulfilling the order.

Figure 24:
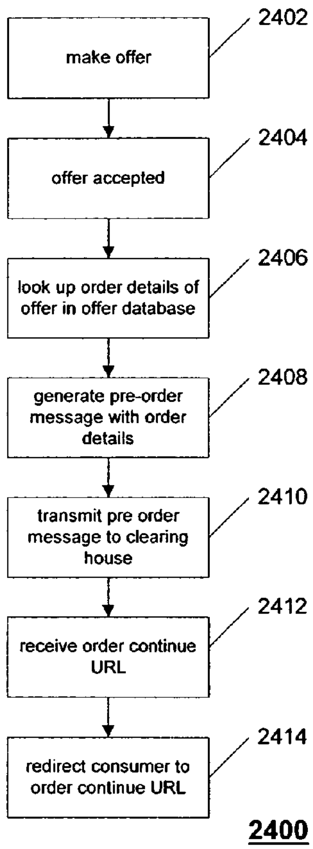
FIG. 24 illustrates process of generating DRM agnostic permit transactions from the prospective of a web retailer.
Figure 25:
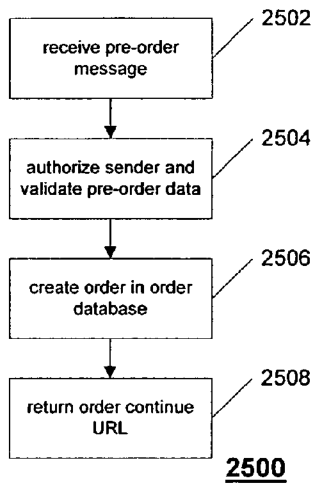
FIG. 25 illustrates the process of generating DRM agnostic transactions from the prospective of a clearing house.
Figure 26:
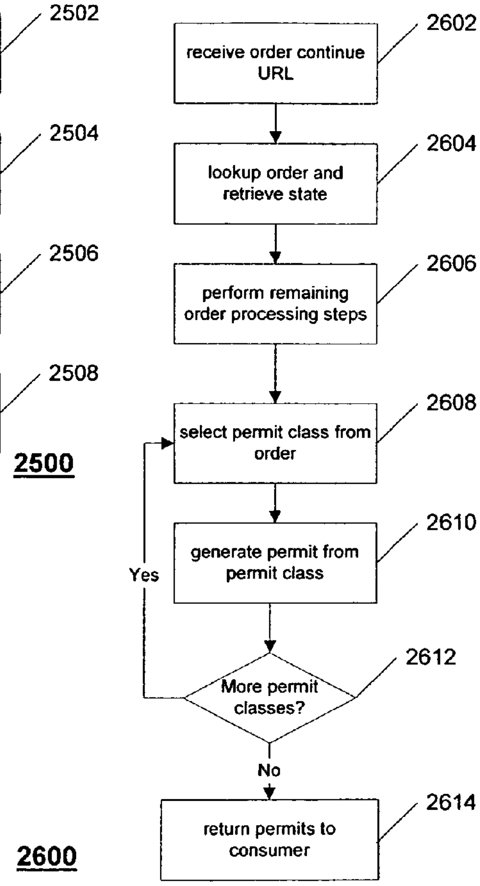
FIG. 26 illustrates the operation of processing a order continue URL.

FIGS. 24, 25, and 26 illustrate the operation of generating and processing DRM agnostic permit transactions. FIG. 24 illustrates a process 2400 of generating DRM agnostic permit transactions from the prospective of web retailer 170, which is now described. Web retailer 170 makes an offer to consumer 110 in step 2402. In step 2404, web retailer 170 receives an offer acceptance from consumer 110. In response to the offer acceptance, web retailer 170 retrieves the order details of the offer from an external offer database 2106. The order details include the permit class or classes 414 identifying the permits 410 desired by consumer 110.

In step 2408, web retailer 170 generates a pre-order message with the order details retrieved from external offer database 2106 in step 2406. Preferably, this pre-order message is formatted as an XML message and is illustrated in FIG. 21 as SPOP XML order 2138. SPOP XML order 2138 specifies the clearing house 2100 process steps of completing the permit transaction, as described above. Web retailer 170 transmits the pre-order message to order management web server 2108 in step 2410.

Clearing house 2100 responds to SPOP XML order 2138 with an order continue URL, as described above, which web retailer 170 receives in step 2412. In an alternate embodiment, order continue URL is sent directly to consumer 110. In step 2414, consumer 110 is redirected to the Internet address identified by order continue URL, preferably by selecting the order continue URL at a web page or from some other source, such as email, etc. From the prospective of web retailer 170, the permit transaction is completed when consumer 110 selects the order continue URL.

FIG. 25 illustrates a process 2500 of generating DRM agnostic transactions from the prospective of clearing house 2100, which is now described. In step 2502, order management web server 2108 receives the pre-order message from web retailer 170, preferably as SPOP XML order 2138. Order management web server 2108 forwards SPOP XML order 2138 to order management system 2110, which in turn forwards it to SPOP server 2114. In step 2504, SPOP server 2114 authorizes web retailer 170 and validates the pre-order message data.

In step 2506, SPOP server 2114 creates an order in order database 2112. The order in order database 2112 is as described above in conjunction with FIG. 21. Order management system 2110 generates an order continue URL to be returned to web retailer 170, based on the order in order database 2112. The order continue URL identifies the particular order created in order database 2112. Order management system 2110 sends the order continue URL to order management web server 2108, which in turn, sends the order continue URL to either web retailer 170 or consumer 110, as described above.

FIG. 26 illustrates an operation 2600 of processing the order continue URL. In a preferred embodiment, consumer 110 is redirected to the Internet address of the order continue URL from web retailer 170 in step 2414 in FIG. 24. The order continue URL identifies the particular order in order database 2112 created in step 2506 of FIG. 25. Order management web server 2108 receives a request from consumer 110 when consumer 110 selects the order continue URL. Order management web server 2108 passes the request to order management system 2110. In step 2604, order management system 2110 retrieves order details and state information associated with the order continue URL from order database 2112. Order management system 2110 submits requests to the various subsystems of clearing house 2100 to perform the remaining order processing steps, as described above, in step 2606.

After the remaining order processing steps have been completed, order management system 2110 requests the particular permit class 414 identified by the order. Order management system 2110 submits a request for permit 410 to permit system 2122. In the request, order management system 2110 specifies the desired permit class. In step 2610, permit system 2122 submits a request to the particular DRM server 2124 identified by the DRM architecture associated with permit class 414. In response, DRM server 2124 generates permit 410 according to the particular DRM architecture. Permit 410 is returned to permit system 2122, which forwards permit 410 to order management system 2110.

In decision step 2612 order management system 2110 determines if the order includes additional permit requests. Additional permit requests are represented by additional permit classes 414 in the order. If additional permit requests exist, order management system 2110 continues to request permits 410 from permit system 2122. When all permits 410 associated with the order have been generated, order management system 2110 passes the permits 410 to order management web server 2108. Order management web server 2108 provides the permits generated in process 2600 to consumer 110 in step 2614. Consumer 110 may access protected content 200 once the permit or permits 410 have been installed according to the particular DRM architecture of permit class 414.

DRM Agnostic Permit Class Creation

Another benefit of clearing house 2100 is DRM agnostic permit class creation. As described above, clearing house 2100 may create permit classes 414 for multiple, incompatible DRM architectures, thereby enabling centralized permit class management. Centralized permit class management allows multiple content providers 130, content packagers 140 and web retailers 170 to access a central permit class clearing house. Centralized permit class management provides for the establishment of distributed packaging across multiple packaging partners, as described above. Through centralized permit class management, a content packager or content provider may define permit classes with which content is to be packaged.

An important benefit of DRM agnostic clearing house is enabling a content provider or packager to convey the right to distribute permits to third parties, such as web retailers. The content packager packages the content using a particular permit class. The resulting container is then distributed, or made available to consumers in any of a number of ways. For example, the container can be made available through web retailers, web sites, on media such as magnetic disk or CD-ROM, etc. The content packager provides the permit class identifier, uniquely identifying the permit class for generating permits for web retailers. When a consumer wishes to purchase the access rights to the protected content, the web retailer provides the permit class identifier to the clearing house, and the clearing house generates the associated permit, as described above. The permit is subsequently provided to consumer 110, thereby granting access to the content.

Clearing house 2100 begins the DRM agnostic permit class creation process when provider web 2132 receives a permit class creation request from content packager 140 or content provider 130. In a preferred embodiment, the permit class creation request is an Extensible Markup Language (XML) message transmitted via the Internet. Provider web 2132 receives the permit class creation request from content packager 140. The permit class creation request identifies a particular permit class to be created by content provider 130 or content packager 140. In response to this request, provider web 2132 requests permit class 414 from permit system 2122. Permit system 2122 preferably operates as an interface to DRM servers 2124. In other embodiments, however, provider web 2132 may access DRM servers 2124 directly.

Next, permit system 2122 submits a request to generate new permit class 414 to one of DRM servers 2124. Permit system 2122 accesses the one of DRM servers 2124 associated with the DRM architecture of the request, preferably through the CORBA IDL interface, and requests that permit class 414 be generated. In response to the request for permit class 414, one of DRM servers 2124 generates permit class 414 in accord with the particular DRM architecture. Once generated, permit class 414 is returned to permit system 2122.

Permit system 2122 "registers" the new permit class 414 in permit class database 2134, in part, by storing the new permit class in permit class database 2134 so that it may be subsequently retrieved upon the next request to permit system 2122. Permit classes known to clearing house 2100 (i.e., permit classes that exist within clearing house 2100) are stored in permit class database 2134, preferably according to their descriptions. Preferably, permit class database 2134 stores each permit class created on clearing house 2100 by DRM servers 2124. Additionally, permit class database 2134 may be "seeded" with additional permit classes from other DRM servers, or clearing house systems.

Permit system 2122, upon receiving the request for a new permit class 414 from provider web 2132, checks permit class database 2134 to determine if permit class 414 already exists. If permit class 414 already exists, permit system 2122 retrieves permit class 414 from permit class database 2134, and passes it to provider web 2132, in fulfillment of the request.

After storing new permit class 414 in permit class database 2134, permit system 2122 sends permit class 414 and a unique permit class identifier to provider web 2132. Provider web 2132, in turn, responds to the permit class creation request of content packager 140 or content provider 130 with permit class 414 and a unique permit class identifier. The unique permit identifier allows content packager 140 to request the same permit class again, or provide the unique permit identifier to other entities, so they might package content with permit class 414, or generate permits for content packaged with permit class 414. Content packager 140 may begin distributing or using permit class 414 once it is received.

Permit Transaction Scenarios

Permit acquisition is the process by which consumer 110 obtains permit 410. The particular process of acquiring permit 410 is called a permit transaction. Parties to a permit transaction, or entities (e.g., consumer 110, clearing house 2100, content provider 130, content packager 140), in addition to the permit transaction define a particular scenario. A scenario is a combination of steps and entities that define the process of consumer 110 acquiring permit 410 from clearing house 120. Although consumer 110 acquires permit 410, and clearing house 2100 generates or creates permit 410, there may be other entities, such as content providers 130, content packager 140 or web retailer 170 involved in the permit transaction. These other entities (i.e., an entity other than consumer 110 and clearing house 120) are collectively referred to sponsors 190.

Various scenarios exist based on which participants perform steps 620–650 as described in conjunction with FIG. 6. There are four primary scenarios, defined as clearing house vended offers, sponsor authorized/clearing house vended offers, sponsor vended offers, and sponsor pre-authorized offers.

With respect to clearing house vended offers, consumer 110 selects an offer (e.g., clearing house offer URL 2140) to be processed directly by clearing house 2100. Clearing house 2100 performs all of the necessary processing associated with the offer: data collection (optional), payment processing (optional), and permit generation/delivery. Preferably, all clearing house vended offers are pre-defined with information such as cost, payment distribution, list of associated permit classes 414 stored in permit class database 2134 database, etc. The definitions of clearing house vended offers associated with the particular clearing house offer URL 2140 are stored in clearing house offer database 2128. When order management web server 2108 receives a request from consumer 110 through clearing house offer URL 2140, order management system 2110 looks up the terms of the offer and creates an order in order database 2112.

With respect to sponsor authorized/clearing house vended offers, sponsor 190 of the offer wishes to collect demographic information from consumer 110 and/or ensure (in a sponsor-specific way) that consumer 110 is, in fact, entitled to the requested offer. For example, sponsor 190 may wish to collect address information so as to track sales. Similarly, sponsor 190 may wish to verify membership of a particular consumer 110 claiming membership in the organization of sponsor 190. Vetting is the process of investigating consumer 110. Once sponsor 190 completes the data collection/vetting, clearing house 2100 completes the transaction, collecting money (if required) and delivering the 410.

In this and all of the remaining scenarios, where sponsor 190 submits the actual pre-order, sponsor 190 has the ability to dynamically create offers by specifying cost, permit list, permit transaction process, and description, as described above.

With respect to sponsor vended offers, sponsor 190 may wish to perform the actual financial transaction in addition to (optionally) collecting demographic information. In this scenario, clearing house 2100 is only responsible for creating and delivering permits 410 associated with the order.

With respect to sponsor pre-authorized offers, permits 410 are authorized prior to a request from consumer 110. Such would be the case, for example, in a business-to-business relationship wherein one business purchases 50 licenses to access a report. This business would purchase permits 410 or in effect, rights to use the report without necessarily receiving the actual permits 410. Subsequently, consumers 110 may redeem one of the 50 licenses for the already purchased permit 410 and then access the report from container 100. In this scenario, all vetting and payment is done out-of-band (i.e., outside of clearing house 2100) and the only transaction to complete is the creation and delivery of permits 410. The main difference with this scenario is that consumer 110 may not be involved in the initial order process and no consumer identity is submitted in the pre-order.

Figure 14:
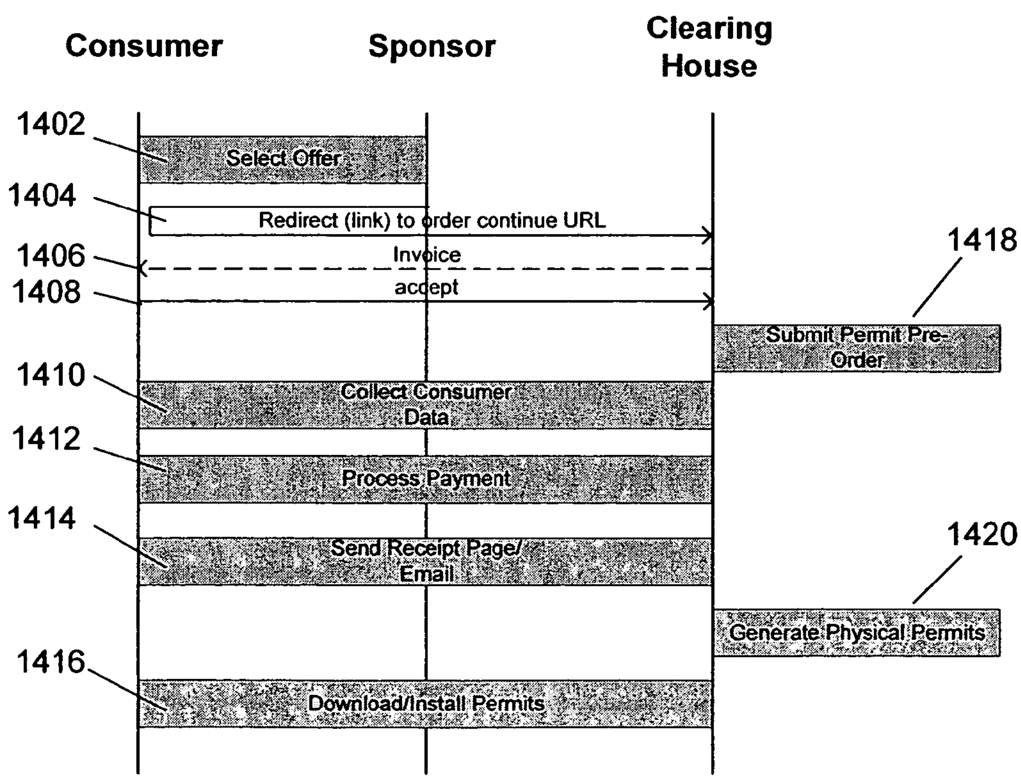
FIG. 14 illustrates the vending of offers by a clearing house according to one embodiment of the present invention.

FIGS. 14–19 illustrate message sequence charts of communication between consumer 110, sponsor 190, and clearing house 2100. The message sequence charts of FIGS. 14–19 illustrate the particular messages and order of messaging transmitted between entities during a permit transaction period. Electronic messages are transmitted, preferably via the Internet, between consumer 110, sponsor 190, and clearing house 2100. Because the message sequence charts of FIGS. 14–19 differ introduce a number of the same messages steps, FIG. 14 is described entirely and FIGS. 15–19 are described in general with particular features described in detail.

It should be noted, however, that the scenarios of FIGS. 14–19 are exemplary scenarios and are not intended to be exclusive of any other scenarios. One of the primary features and benefits of the present invention is that the pre-order message may define the permit transaction. As described above, sponsor 190 may define the details of the permit transaction and transmit it to the clearing house via the pre-order message for processing.

While described in terms of clearing house 120, it should be understood that the following discussion applies equally well to clearing house 2100. Furthermore, FIGS. 14–19 are described in terms of "consumer," "sponsor" and "clearing house" rather than their respective elements for purposes of clarity.

Figure 15:
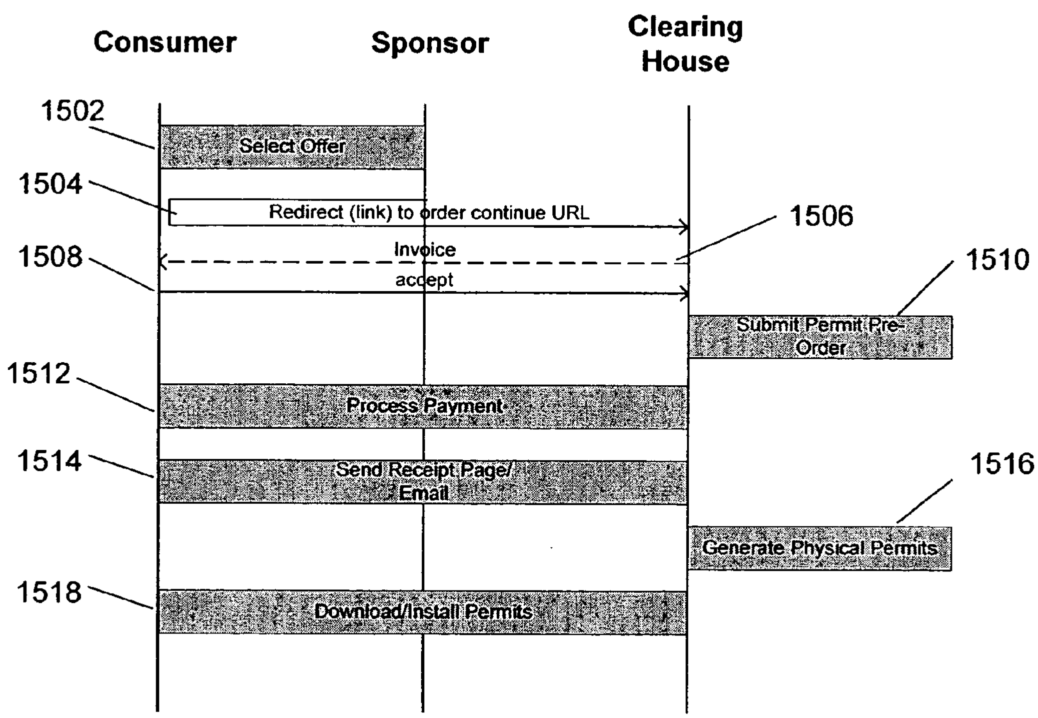
FIG. 15 illustrates the vending of offers by a clearing house according to an alternate embodiment of the present invention.
Figure 19:
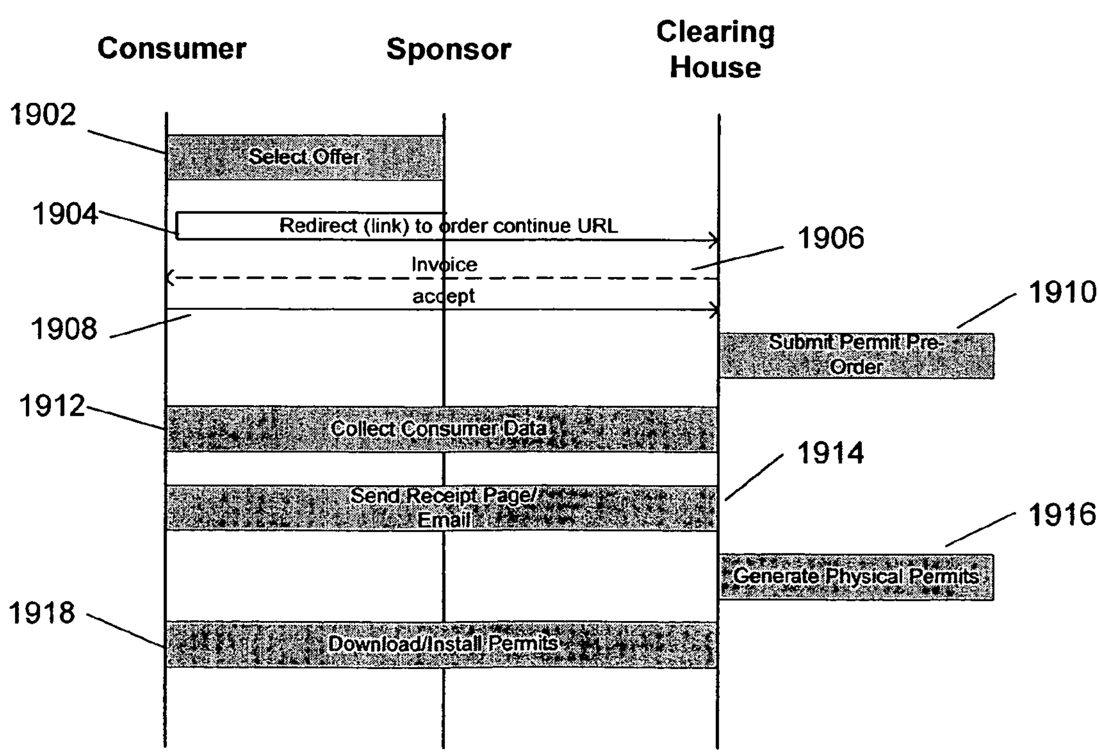
FIG. 19 illustrates the vending of offers by a clearing house according to a further alternate embodiment of the present invention.

FIG. 14, FIG. 15, and FIG. 19 illustrate alternate vending operations of clearing house vended offers in further detail. As discussed above, clearing house 120 handles all aspects of the permit vending process although the sponsor may host the offer(s) page that initiates the vending cycle.

Consumer 110 views the sponsor's offer(s) page and selects a specific offer by clicking on the order page link. The order page link references a clearing house web server. Clearing house 120 processes the offer selection by generating the appropriate order page for the offer. Consumer 110 confirms the order by clicking on the continue button.

Three options exists with respect to how the order is processed. In the first option, clearing house 120 collects both consumer data and processes payment; in the second option, clearing house 120 only processes payment; and in the third option, clearing house 120 only collects consumer data. In all cases, consumer 110 is first asked to confirm their acceptance by responding to a clearing house delivered notice. The operation of the first option is now described with reference to FIG. 14. In the first option, clearing house 120 generates the invoice to collect consumer order confirmation. Consumer 110 agrees and clicks on the continue button. Clearing house 120 processes the request as follows: 1) checks the order database for a duplicate request/in progress order, 2) generates pre-order and sends it to the permit server, and 3) generates the order page to collect consumer data.

Consumer 110 enters necessary data. Clearing house 120 processes the response by generating the order page to collect consumer payment information. Consumer 110 responds with payment information and clearing house 120 handles this response as follows: 1) update the order status, 2) returns "keep alive" page to consumer, 3) authorizes payment, 4) updates the order status, 5) generates/sends receipt mail with order download URL, and 6) generates receipt page (to be returned by "keep alive page").

The second option is now described with reference to FIG. 15. In this option, clearing house 120 only processes payment. Clearing house 120 generates the invoice to collect consumer order confirmation. Consumer 110 agrees and clicks on the continue button. Clearing house 120 handles the response as follows: 1) checks the order database for a duplicate request/in progress order, 2) generates pre-order and sends to the permit server, 3) generates the order page to collect consumer payment information. Consumer 110 responds with payment information and clearing house 120 subsequently handles this response as follows: 1) returns "keep alive" page to consumer, 2) authorizes payment, 3) updates the order status, 4) generates/sends receipt mail with order download URL, and 5) generates receipt page (to be returned by "keep alive page").

The third option is now described in reference to FIG. 19. In the third option, clearing house 120 generates the invoice to collect consumer order confirmation. Consumer 110 agrees and clicks on the continue button. Clearing house 120 processes the request as follows: 1) checks the order database for a duplicate request/in progress order, 2) generates pre-order and send it to the permit server, and 3) generates the order page to collect consumer data.

Consumer 110 enters the necessary data. Clearing house 120 processes the response as follows: 1) generates and sends receipt mail with order download URL, and 2) generates receipt page.

All options perform the following steps. Consumer 110 clicks on the "download order" button from the receipt page and selects open from the browser dialog. If consumer 110 selected the save file option from the browser dialog, then a handoff of the file to it's associated application, e.g., a double click, would be required to initiate the permit registration described below.

The permit server of clearing house 120 creates permits 410 associated with the order and returns it to the consumer. When the permit download is complete, a register utility of viewer 300 automatically registers permit 410 and displays a "permit installed" confirmation dialog.

Figure 16:
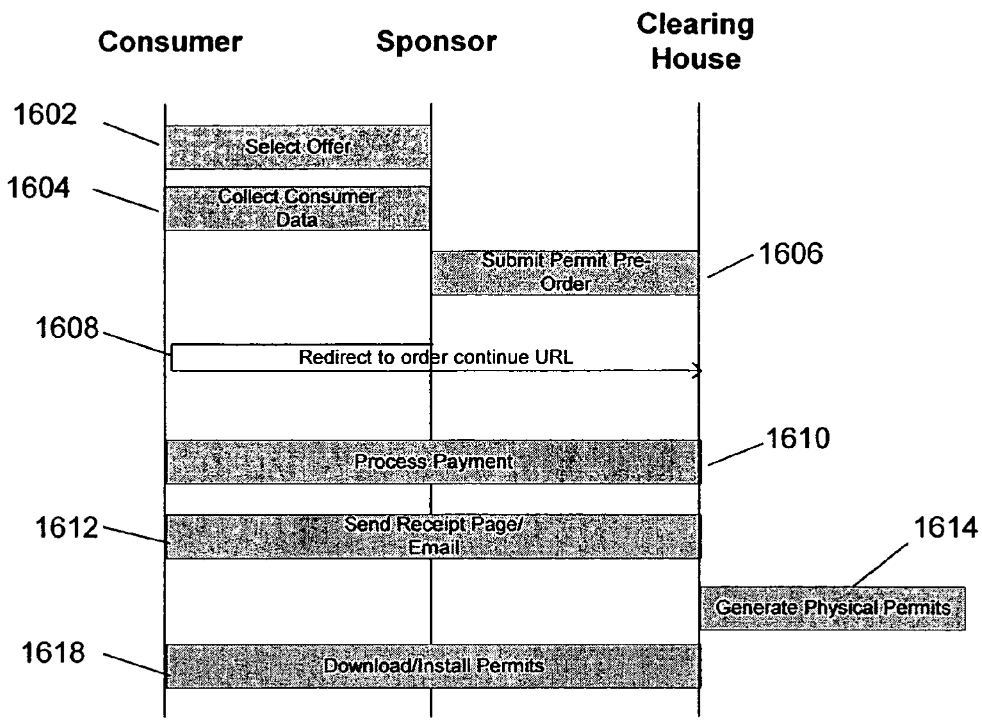
FIG. 16 illustrates the vending of sponsor authorized offers by a clearing house according to one embodiment of the present invention.

FIG. 16 illustrates the vending of sponsor authorized/clearing house vended offers in further detail. As discussed above, the sponsor manages the first phase of the order transaction. This phase includes any of the following: permit selection, consumer data collection, and any required authorization. The final phase is managed by clearing house 120 and includes financial order page presentation, consumer payment processing, and generation of the physical permit.

Consumer 110 views the sponsor-hosted offer(s) page and selects a specific permit to obtain by clicking on the sponsor's order page link. Consumer 110 confirms the permit selection on the order page, enters any necessary information (demographic data and/or authorization data), and clicks on the continue button. The sponsor's web server performs the following processing: 1) checks the sponsor order database for a duplicate request/in progress order, 2) creates initial entry in the sponsor order database, 3) generates and returns "keep alive" page to consumer, 4) generates pre-order and transmits to the permit server, and 4) generates "continue" page with the order continue URL (page to be returned by "keep alive page"). The sponsor may choose to divide these steps into any number of actual forms. The end result is that the sponsor has collected all necessary information, authorizes that consumer 110 is eligible for the offer, and directs consumer 110 to clearing house via a continue page.

Consumer clicks on the order continue link on the sponsor "continue" page. Clearing house 120 permit server generates and returns financial offer page to the consumer. Consumer enters financial data and clicks on the "submit" button on the financial offer page. Clearing house 120 performs the following processing: 1) checks permit order database for duplicate request/in progress order, 2) generates "keep alive/processing . . . " page, 3) performs payment processing, 4) updates permit order database, 5) sends optional receipt e-mail containing the order download URL, 6) generates receipt page containing the order download URL (to be returned by "keep alive page"), and 7) sends vend receipt to vendor (can be joined by pre-order order number).

Consumer 110 selects the "download permit" button on the receipt page. The permit server creates permits 410 associated with the order and returns them to consumer 110. When the permit download is complete, viewer 300 register utility automatically registers permit 410 and displays a "permit installed" confirmation dialog.

Figure 17:
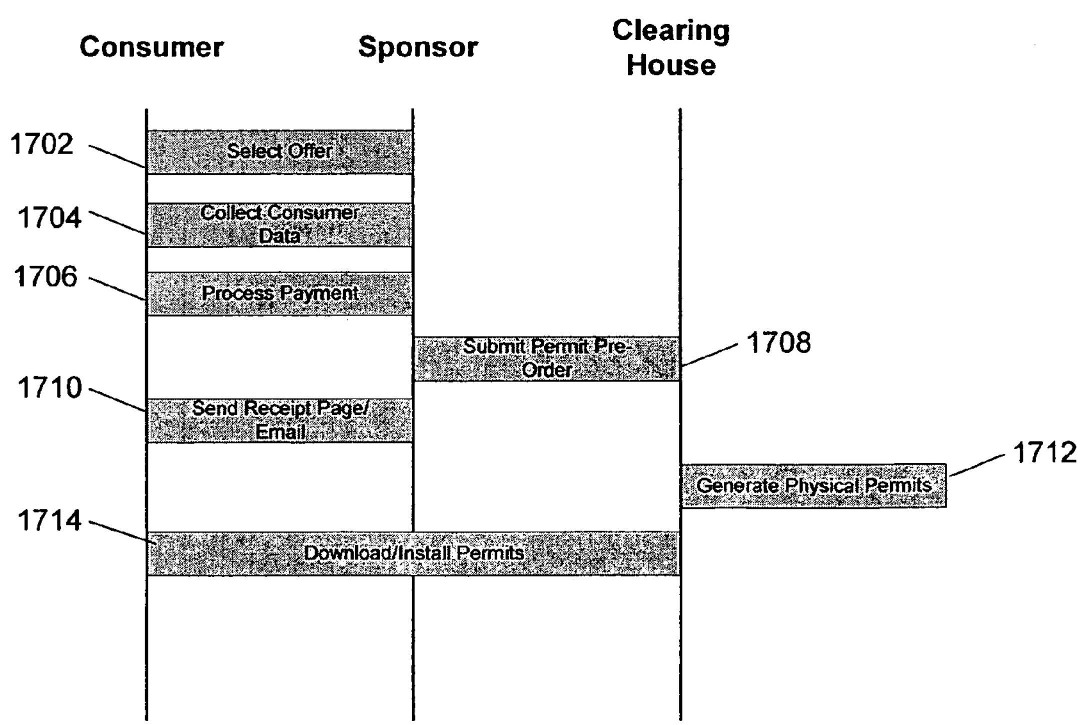
FIG. 17 illustrates the vending of offers by a sponsor according to one embodiment of the present invention.

FIG. 17 illustrates the vending of sponsor vended offers in further detail. As discussed above, the sponsor manages all aspects of the offer vending process. As in all cases, clearing house 120 generates permit 410 and delivers it to consumer 110.

Consumer views the sponsor-hosted offer(s) page and selects a specific offer by clicking on the sponsor's order page link. Consumer 110 confirms the permit selection on the order page, enters any necessary information (credit card info and/or demographic data), and clicks on the continue button.

The sponsor's web performs the following processing: 1) checks the order database for a duplicate request/in progress order, 2) creates initial entry in the sponsor order database, 3) generates and returns "keep alive/processing page", 4) performs payment processing (if required), 5) generates a permit pre-order, transmits it to the permit server, and receives a permit download URL from clearing house 120, 6) sends optional receipt mail containing the order download URL, and 7) generates receipt page containing the order download URL (to be returned by "keep alive page"). The sponsor may choose to divide these steps into any number of actual forms. The end result is that the sponsor has collected all necessary information and authorizes that consumer 110 is eligible for the offer.

Consumer 110 selects the order download URL (link to the permit server) on the sponsor's receipt page. The permit server creates permits 410 associated with the order returns them to consumer 110. When the permit download is complete, viewer 300 register utility automatically registers permit 410 and displays a "permit installed" confirmation dialog.

Figure 18:
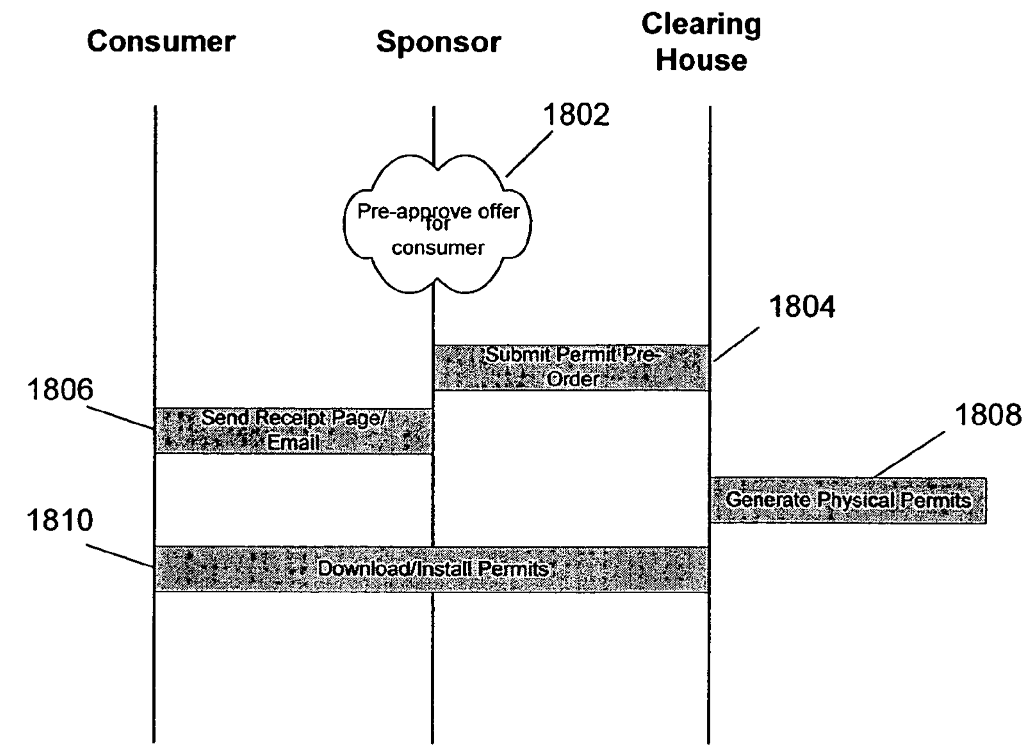
FIG. 18 illustrates the vending of sponsor pre-authorized offers according to one embodiment of the present invention.

FIG. 18 illustrates the vending of sponsor pre-authorized offers in further detail. As discussed above, the sponsor pre-authorizes an order and submits the pre-order to clearing house 120. The resulting permit download URL along with an activation passcode is then sent to an individual. This scenario is designed to handle the case where the sponsor wants to initiate the permit request cycle and send the results to a consumer at some point in the future. Examples include: generating 200 licenses for a corporate customer that will be distributed by the customer to its employees; generating licenses for all current subscribers and sending the permit download URL to each via e-mail; etc.

The sponsor performs the following permit pre-processing: 1) submit permit pre-orders to clearing house 120 (including consumer authentication data), and 2) send order download URL and authentication data to consumers 110 (or distributor).

Consumer 110 clicks on the order download URL (from e-mail or web page). Clearing house 120 returns "authentication data" request form. Consumer 110 enters authentication data and clicks on the "continue" button. Clearing house 120 creates permits 410 and returns them to consumer 110. When the permit download is complete, viewer 300 register utility automatically registers permit 410 and displays a "permit installed" confirmation dialog.

Packager

Figure 20:
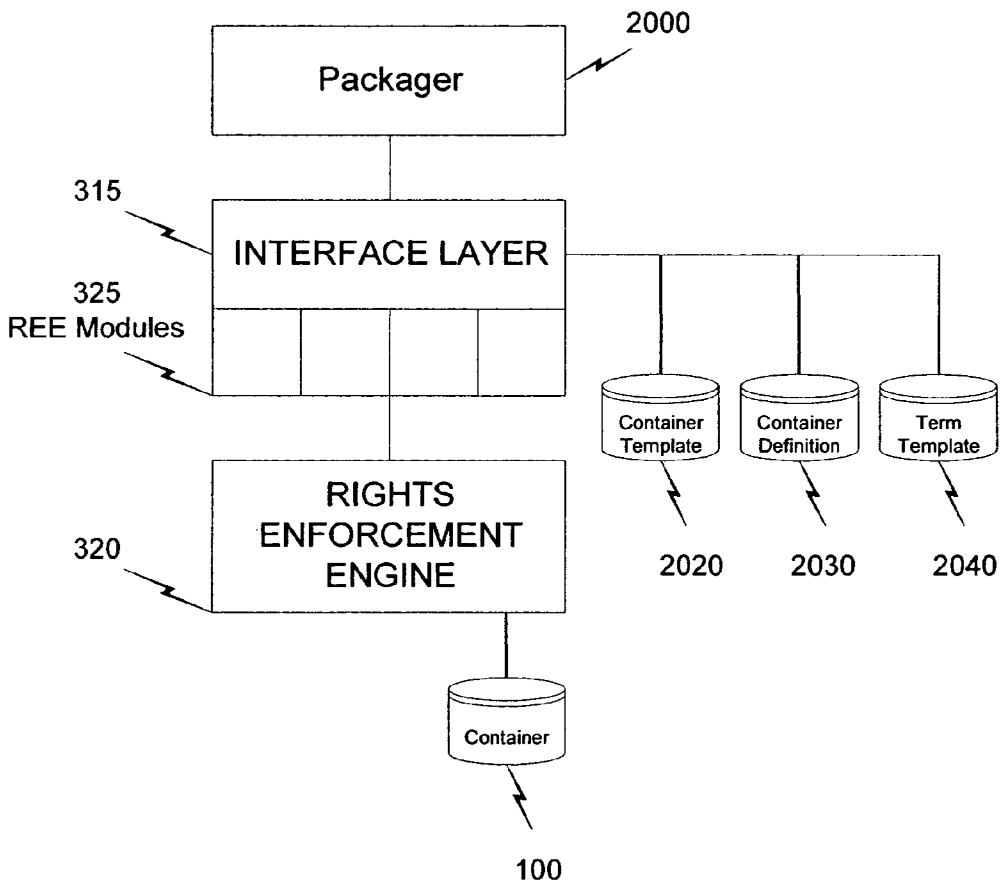
FIG. 20 illustrates a content packager according to the present invention.

FIG. 20 further illustrates content packager 140 according to the present invention. Content packager 140 includes a user and a collection of tools operating on a computer system. These tools include a packager 2000, rights enforcement engine 320, interface layer 315 between packager 2000 and rights enforcement engine 320, and REE modules 325 between the interface layer 315 and rights enforcement engine 320.

Packager 2000 provides the interface to the user and controls the operation of the packager system. Interface layer 315 and REE modules 325 form the interface between rights enforcement engine 320 and packager 2000. Rights enforcement engine 320 is the packaging "engine" that creates container 100 which includes protected content 200. Preferably, rights enforcement engine 320 is a DRM architecture system API for packaging content provided by a DRM architecture vendor. Interface layer 315 and REE modules 325 provide an interface between packager 2000 and rights enforcement engine 320. Interface layer 315 and REE modules 325 enable packager 2000 to operate with rights enforcement engines 320 from multiple DRM architectures, thereby enabling a packager that packages content according to multiple DRM architectures.

Container template 2020, container definition 2030, and term template 2040 are data artifacts used during the container creation process. Each of these artifacts represents a previously stored aspect of the data required by rights enforcement engine 320 to create container 100. Data artifacts 2020, 2030 and 2040 provide input to the packaging process in creating container 100. Container template 2020 is the format of information necessary for the operation of rights enforcement engine 320. Rights enforcement engine 320 may require information in a particular format, or structure, according to the DRM architecture. Container template 2020 provides a template for the format, or structure of the information provided to rights enforcement engine 320. Container definition 2030 is the arrangement of content within container 100. Container definition 2030 specifies how the information is to be organized within container 100, for example, as in a directory structure. Term template 2040 provides the content access terms 2020, or permit class with which protected content 200 is accessed.

According to the present invention, rights enforcement engine 320 includes the basic functions to create container 100 in such a way as to ensure protection of protected content 200. Rights enforcement engine 320 transforms protected content 200 from an unprotected state to a protected one inside container 100. Various rights enforcement engines 320 exist including Microsoft's Data Rights Manager and InterTrust Technology Corp's Commerce and Enterprise Edition Products.

Packager 2000 provides a user the ability to create one or more containers 100 that can be viewed by the viewer 300 as described elsewhere herein. Packager 2000 facilitates the specification, by the user, of content navigation data 240, descriptive properties 210, content access terms 220, content 200 and a link to rights data 230. In doing so, packager 2000 interacts with rights enforcement engine 320, by way of interface layer 315 and REE modules 325, to construct a container 100. In so doing, packager 2000 enables interaction between viewer 300 and container 100 as discussed above.

CONCLUSION

While the invention has been illustrated in the drawings and briefly described with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for managing data rights comprising:

receiving a request for a permit to access a piece of protected content, said piece of protected content protected in accordance with a first data rights management architecture;

determining which one of a plurality of data rights management architectures corresponds to said first data rights management architecture;

generating a permit to access said piece of protected content based on said determined one of said plurality of data rights management architectures; and providing said permit in response to said request whereby said permit grants access to said piece of protected content.

2. The method of claim 1, further comprising processing a permit acquisition term associated with said piece of protected content prior to providing said permit.

3. The method of claim 2, wherein said processing a permit acquisition term comprises retrieving said permit acquisition term based on said request.

4. The method of claim 2, wherein said processing a permit acquisition term comprises presenting a consumer with a query corresponding to said permit acquisition term.

5. The method of claim 4, wherein said processing a permit acquisition term comprises receiving a response to said query from said consumer.

6. The method of claim 2, wherein said processing a permit acquisition term comprises receiving payment information associated with a consumer.

7. The method of claim 2, wherein said processing a permit acquisition term comprises receiving demographic information from a consumer.

8. The method of claim 1, wherein said providing said permit comprises providing said permit to a consumer.

9. The method of claim 1, wherein said providing said permit comprises:

providing said permit to a sponsor; and providing said permit from said sponsor to a consumer.

10. The method of claim 8, wherein said providing said permit to said consumer comprises allowing said consumer to retrieve said permit.

11. The method of claim 1, wherein said determining which one of a plurality of data rights management architectures corresponds to said first data rights management architectures comprises accessing a look-up table.

12. The method of claim 1, wherein said determining which one of a plurality of data rights management architectures corresponds to said first data rights management architectures comprises using information available in said request regarding said first data rights management architectures.

13. The method of claim 12, wherein said determining which one of a plurality of data rights management architectures corresponds to said first data rights management architecture comprises retrieving a permit class associated with said piece of protected content.

14. The method of claim 13, wherein said retrieving a permit class comprises retrieving said permit class from said request.

15. The method of claim 13, wherein said retrieving a permit class comprises retrieving said permit class from a database.

16. An agnostic data rights management clearing house comprising:

an order management system that receives a request to provide access rights to protected content; said protected content packaged in accordance with a first data rights management architecture;

a permit system interfaced to said order management system that determines which one of plurality of data rights management architectures corresponds to said first data rights management architecture, that generates a permit based on said determined one of said plurality of data rights management architectures, and that provides said permit in response to said request to provide access rights to protected content.

17. A permit system comprising:

means for determining which one of a plurality of data rights management architectures corresponds to a particular permit request;

means for generating a permit based on said determined one of a plurality of data rights management architectures; and means for providing said permit in response to said request.

18. A method for managing data rights comprising the steps of:

receiving a request from a sponsor to access protected content, said protected content packaged in accordance with a first data rights management architecture;

determining which one of a plurality of data rights management architectures corresponds to said first data rights management architecture;

generating a permit to access said protected content based on said determined one of said plurality of data rights management architectures.

19. The method of claim 18, further comprising the step of providing said permit to a consumer in response to said request.

20. The method of claim 18, further comprising the step of providing said permit to said sponsor.

21. A method for managing data rights comprising the steps of:

determining which one of a plurality of permit classes was used to protect a piece of protected content; and generating a request for a permit to access the piece of protected content, said request specifying said one of a plurality of permit classes.

22. A method protecting content comprising:

receiving a request from a packager for a first permit class to protect a piece of content, said first permit class associated with a first data rights management architecture;

generating said first permit class; and transmitting said first permit class to said packager.

23. The method of claim 22, further comprising:

receiving a request from a packager for a providing a second permit class to protect a piece of content, said second permit class associated with a second data rights management architecture.

24. A method for generating permit classes comprising:

receiving a request from a sponsor for a first permit class, said first permit class associated with a first data rights management architecture;

transmitting said first permit class to said sponsor;

receiving a request for a second permit class, said second permit class associated with a second data rights management architecture; and transmitting said second permit class to said sponsor.

* * * * *